(12) United States Patent
Smith

(10) Patent No.: US 11,887,598 B2
(45) Date of Patent: *Jan. 30, 2024

(54) VOICE VERIFICATION FOR MEDIA PLAYBACK

(71) Applicant: Sonos, Inc., Santa Barbara, CA (US)

(72) Inventor: Connor Kristopher Smith, New Hudson, MI (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,243

(22) Filed: Dec. 2, 2022

(65) Prior Publication Data
US 2023/0169972 A1 Jun. 1, 2023

Related U.S. Application Data

(63) Continuation of application No. 16/736,725, filed on Jan. 7, 2020, now Pat. No. 11,562,740.

(51) Int. Cl.
*G10L 15/22* (2006.01)
*G10L 17/24* (2013.01)
*H04R 27/00* (2006.01)

(52) U.S. Cl.
CPC ............. *G10L 15/22* (2013.01); *G10L 17/24* (2013.01); *H04R 27/00* (2013.01); *G10L 2015/223* (2013.01); *H04R 2227/005* (2013.01)

(58) Field of Classification Search
CPC ... G10L 15/22; G10L 2015/223; G10L 15/30; G10L 15/26; G10L 17/22; G10L 17/00; G10L 2015/228; G10L 17/24; G06F 3/167
See application file for complete search history.

(56) References Cited

U.S. PATENT DOCUMENTS 999,715 A 8/1911 Gundersen
5,717,768 A 2/1998 Laroche
(Continued)

FOREIGN PATENT DOCUMENTS

CN 1748250 A 3/2006
CN 1781291 A 5/2006
(Continued)

OTHER PUBLICATIONS

Notice of Allowance dated Mar. 24, 2022, issued in connection with U.S. Appl. No. 16/378,516, filed Apr. 8, 2019, 7 pages.
(Continued)

*Primary Examiner* — Mark Villena
(74) *Attorney, Agent, or Firm* — Fortem IP LLP; Matt Lincicum

(57) ABSTRACT

In one aspect, a network microphone device includes a plurality of microphones and is configured to capture a voice input via the one or more microphones, detect a wake word in the voice input, transmit data associated with the voice input to one or more remote computing devices associated with a voice assistant service, and receive a response from the one or more remote computing devices, the response comprising a playback command based on the voice input. The network microphone device may be configured to obtain verification information characterizing the voice input and, based on the verification information indicating that the voice input was spoken by an unverified user, functionally disable the NMD from performing the playback command.

20 Claims, 14 Drawing Sheets

(56) References Cited

U.S. PATENT DOCUMENTS

| | | | |
|---|---|---|---|
| 5,857,172 | A | 1/1999 | Rozak |
| 6,070,140 | A | 5/2000 | Tran |
| 6,219,645 | B1 | 4/2001 | Byers |
| 7,516,068 | B1 | 4/2009 | Clark |
| 7,705,565 | B2 | 4/2010 | Patino et al. |
| 8,325,909 | B2 | 12/2012 | Tashev et al. |
| 8,594,320 | B2 | 11/2013 | Faller |
| 8,620,232 | B2 | 12/2013 | Helsloot |
| 8,639,214 | B1 | 1/2014 | Fujisaki |
| 8,762,156 | B2 | 6/2014 | Chen |
| 8,898,063 | B1* | 11/2014 | Sykes .................. G06Q 40/06 704/275 |
| 9,002,024 | B2 | 4/2015 | Nakadai et al. |
| 9,047,857 | B1 | 6/2015 | Barton |
| 9,070,367 | B1 | 6/2015 | Hoffmeister et al. |
| 9,088,336 | B2 | 7/2015 | Mani et al. |
| 9,183,845 | B1 | 11/2015 | Gopalakrishnan et al. |
| 9,313,317 | B1 | 4/2016 | Lebeau et al. |
| 9,354,687 | B2 | 5/2016 | Bansal et al. |
| 9,491,033 | B1* | 11/2016 | Soyannwo ............ H04L 67/141 |
| 9,514,747 | B1 | 12/2016 | Bisani et al. |
| 9,532,139 | B1 | 12/2016 | Lu et al. |
| 9,542,941 | B1 | 1/2017 | Weksler et al. |
| 9,558,755 | B1 | 1/2017 | Laroche et al. |
| 9,640,194 | B1 | 5/2017 | Nemala et al. |
| 9,672,812 | B1 | 6/2017 | Watanabe et al. |
| 9,691,384 | B1 | 6/2017 | Wang et al. |
| 9,706,320 | B2 | 7/2017 | Starobin et al. |
| 9,749,738 | B1 | 8/2017 | Adsumilli et al. |
| 9,756,422 | B2 | 9/2017 | Paquier et al. |
| 9,767,786 | B2 | 9/2017 | Starobin et al. |
| 9,781,532 | B2 | 10/2017 | Sheen |
| 9,799,330 | B2 | 10/2017 | Nemala et al. |
| 9,812,128 | B2 | 11/2017 | Mixter et al. |
| 9,875,740 | B1 | 1/2018 | Kumar et al. |
| 9,898,250 | B1 | 2/2018 | Williams et al. |
| 9,899,021 | B1 | 2/2018 | Vitaladevuni et al. |
| 9,992,642 | B1 | 6/2018 | Rapp et al. |
| 10,028,069 | B1 | 7/2018 | Lang |
| 10,038,419 | B1 | 7/2018 | Elliot et al. |
| 10,134,398 | B2 | 11/2018 | Sharifi |
| 10,186,276 | B2 | 1/2019 | Dewasurendra et al. |
| 10,249,205 | B2 | 4/2019 | Hammersley et al. |
| 10,304,440 | B1 | 5/2019 | Panchapagesan et al. |
| 10,304,475 | B1 | 5/2019 | Wang et al. |
| 10,318,236 | B1 | 6/2019 | Pal et al. |
| 10,332,508 | B1 | 6/2019 | Hoffmeister |
| 10,354,658 | B2 | 7/2019 | Wilberding |
| 10,424,296 | B2 | 9/2019 | Penilla et al. |
| 10,565,998 | B2 | 2/2020 | Wilberding |
| 10,580,405 | B1 | 3/2020 | Wang et al. |
| 10,586,534 | B1 | 3/2020 | Argyropoulos et al. |
| 10,593,328 | B1 | 3/2020 | Wang et al. |
| 10,593,330 | B2 | 3/2020 | Sharifi |
| 10,699,711 | B2 | 6/2020 | Reilly |
| 10,777,203 | B1 | 9/2020 | Pasko |
| 10,824,682 | B2 | 11/2020 | Alvares et al. |
| 10,825,471 | B2 | 11/2020 | Walley et al. |
| 10,837,667 | B2 | 11/2020 | Nelson et al. |
| 10,847,137 | B1 | 11/2020 | Mandal et al. |
| 10,867,604 | B2 | 12/2020 | Smith et al. |
| 10,871,943 | B1 | 12/2020 | D'Amato et al. |
| 10,878,811 | B2 | 12/2020 | Smith et al. |
| 10,911,596 | B1 | 2/2021 | Do et al. |
| 10,964,314 | B2 | 3/2021 | Jazi et al. |
| 11,024,311 | B2 | 6/2021 | Mixter et al. |
| 11,050,615 | B2 | 6/2021 | Mathews et al. |
| 11,062,705 | B2 | 7/2021 | Watanabe et al. |
| 11,100,923 | B2 | 8/2021 | Fainberg et al. |
| 11,127,405 | B1 | 9/2021 | Antos et al. |
| 11,137,979 | B2 | 10/2021 | Plagge |
| 11,138,969 | B2 | 10/2021 | D'Amato |
| 11,159,878 | B1 | 10/2021 | Chatlani et al. |
| 11,172,328 | B2 | 11/2021 | Soto et al. |
| 11,172,329 | B2 | 11/2021 | Soto et al. |
| 11,175,880 | B2 | 11/2021 | Liu et al. |
| 11,184,704 | B2 | 11/2021 | Jarvis et al. |
| 11,206,052 | B1 | 12/2021 | Park et al. |
| 11,212,612 | B2 | 12/2021 | Lang et al. |
| 11,264,019 | B2 | 3/2022 | Bhattacharya et al. |
| 11,277,512 | B1 | 3/2022 | Leeds et al. |
| 11,315,556 | B2 | 4/2022 | Smith et al. |
| 11,354,092 | B2 | 6/2022 | D'Amato et al. |
| 11,361,763 | B1 | 6/2022 | Maas et al. |
| 11,373,645 | B1* | 6/2022 | Mathew .............. G10L 15/1815 |
| 11,411,763 | B2 | 8/2022 | Mackay et al. |
| 11,445,301 | B2 | 9/2022 | Park et al. |
| 11,514,898 | B2 | 11/2022 | Millington |
| 2002/0054685 | A1 | 5/2002 | Avendano et al. |
| 2002/0055950 | A1 | 5/2002 | Witteman |
| 2002/0143532 | A1 | 10/2002 | McLean et al. |
| 2004/0153321 | A1 | 8/2004 | Chung et al. |
| 2004/0161082 | A1 | 8/2004 | Brown et al. |
| 2007/0038461 | A1* | 2/2007 | Abbott ................ G10L 15/30 704/E15.047 |
| 2008/0160977 | A1 | 7/2008 | Ahmaniemi et al. |
| 2008/0192946 | A1 | 8/2008 | Faller |
| 2008/0291916 | A1 | 11/2008 | Xiong et al. |
| 2009/0013255 | A1 | 1/2009 | Yuschik et al. |
| 2009/0113053 | A1 | 4/2009 | Van Wie et al. |
| 2009/0214048 | A1 | 8/2009 | Stokes, III et al. |
| 2009/0299745 | A1 | 12/2009 | Kennewick et al. |
| 2009/0323924 | A1 | 12/2009 | Tashev et al. |
| 2010/0070276 | A1 | 3/2010 | Wasserblat et al. |
| 2010/0179806 | A1 | 7/2010 | Zhang et al. |
| 2010/0260348 | A1 | 10/2010 | Bhow et al. |
| 2010/0299639 | A1 | 11/2010 | Ramsay et al. |
| 2010/0329472 | A1 | 12/2010 | Nakadai et al. |
| 2010/0332236 | A1 | 12/2010 | Tan |
| 2011/0019833 | A1 | 1/2011 | Kuech et al. |
| 2011/0176687 | A1 | 7/2011 | Birkenes |
| 2012/0009906 | A1 | 1/2012 | Patterson et al. |
| 2012/0020485 | A1 | 1/2012 | Visser et al. |
| 2012/0027218 | A1 | 2/2012 | Every et al. |
| 2012/0076308 | A1 | 3/2012 | Kuech et al. |
| 2012/0224457 | A1 | 9/2012 | Kim et al. |
| 2012/0237047 | A1 | 9/2012 | Neal et al. |
| 2012/0245941 | A1 | 9/2012 | Cheyer |
| 2012/0265528 | A1 | 10/2012 | Gruber et al. |
| 2013/0073293 | A1 | 3/2013 | Jang et al. |
| 2013/0080167 | A1 | 3/2013 | Mozer |
| 2013/0080171 | A1 | 3/2013 | Mozer et al. |
| 2013/0129100 | A1 | 5/2013 | Sorensen |
| 2013/0185639 | A1 | 7/2013 | Lim |
| 2013/0230184 | A1 | 9/2013 | Kuech et al. |
| 2013/0238326 | A1 | 9/2013 | Kim et al. |
| 2013/0283169 | A1 | 10/2013 | Van Wie |
| 2013/0289994 | A1 | 10/2013 | Newman et al. |
| 2013/0294611 | A1 | 11/2013 | Yoo et al. |
| 2013/0301840 | A1 | 11/2013 | Yemdji et al. |
| 2013/0322634 | A1 | 12/2013 | Bennett et al. |
| 2013/0336499 | A1 | 12/2013 | Beckhardt et al. |
| 2014/0056435 | A1 | 2/2014 | Kjems et al. |
| 2014/0064476 | A1 | 3/2014 | Mani et al. |
| 2014/0108010 | A1 | 4/2014 | Maltseff et al. |
| 2014/0126745 | A1 | 5/2014 | Dickins et al. |
| 2014/0159581 | A1 | 6/2014 | Pruemmer et al. |
| 2014/0161263 | A1 | 6/2014 | Koishida et al. |
| 2014/0172899 | A1 | 6/2014 | Hakkani-Tur et al. |
| 2014/0181199 | A1 | 6/2014 | Kumar et al. |
| 2014/0188476 | A1 | 7/2014 | Li et al. |
| 2014/0200881 | A1 | 7/2014 | Chatlani |
| 2014/0229959 | A1 | 8/2014 | Beckhardt et al. |
| 2014/0244269 | A1 | 8/2014 | Tokutake |
| 2014/0270216 | A1 | 9/2014 | Tsilfidis et al. |
| 2014/0278343 | A1 | 9/2014 | Tran |
| 2014/0288686 | A1 | 9/2014 | Sant et al. |
| 2014/0328490 | A1 | 11/2014 | Mohammad et al. |
| 2014/0364089 | A1 | 12/2014 | Lienhart et al. |
| 2014/0365225 | A1 | 12/2014 | Haiut |
| 2014/0368734 | A1 | 12/2014 | Hoffert et al. |
| 2015/0032443 | A1 | 1/2015 | Karov et al. |
| 2015/0032456 | A1 | 1/2015 | Wait |
| 2015/0039310 | A1 | 2/2015 | Clark et al. |

(56) References Cited

U.S. PATENT DOCUMENTS

| | | |
|---|---|---|
| 2015/0039311 A1 | 2/2015 | Clark et al. |
| 2015/0073807 A1 | 3/2015 | Kumar |
| 2015/0126255 A1 | 5/2015 | Yang et al. |
| 2015/0154953 A1 | 6/2015 | Bapat et al. |
| 2015/0221307 A1 | 8/2015 | Shah et al. |
| 2015/0373100 A1 | 12/2015 | Kravets et al. |
| 2015/0382128 A1 | 12/2015 | Ridihalgh et al. |
| 2016/0027440 A1 | 1/2016 | Gelfenbeyn et al. |
| 2016/0034448 A1 | 2/2016 | Tran |
| 2016/0055847 A1 | 2/2016 | Dahan |
| 2016/0066087 A1 | 3/2016 | Solbach et al. |
| 2016/0077794 A1 | 3/2016 | Kim et al. |
| 2016/0093281 A1 | 3/2016 | Kuo et al. |
| 2016/0134924 A1 | 5/2016 | Bush et al. |
| 2016/0148612 A1 | 5/2016 | Guo et al. |
| 2016/0212488 A1 | 7/2016 | Os et al. |
| 2016/0299737 A1 | 10/2016 | Clayton et al. |
| 2016/0379635 A1 | 12/2016 | Page |
| 2017/0025124 A1 | 1/2017 | Mixter et al. |
| 2017/0040002 A1 | 2/2017 | Basson et al. |
| 2017/0083606 A1 | 3/2017 | Mohan |
| 2017/0084278 A1 | 3/2017 | Jung |
| 2017/0110130 A1 | 4/2017 | Sharifi et al. |
| 2017/0140750 A1 | 5/2017 | Wang et al. |
| 2017/0140757 A1 | 5/2017 | Penilla et al. |
| 2017/0164139 A1 | 6/2017 | Deselaers et al. |
| 2017/0186425 A1 | 6/2017 | Dawes et al. |
| 2017/0186427 A1 | 6/2017 | Wang et al. |
| 2017/0242656 A1 | 8/2017 | Plagge et al. |
| 2017/0269900 A1 | 9/2017 | Triplett |
| 2017/0300289 A1 | 10/2017 | Gattis |
| 2017/0329397 A1 | 11/2017 | Lin |
| 2017/0357390 A1 | 12/2017 | Alonso Ruiz et al. |
| 2017/0364371 A1 | 12/2017 | Nandi et al. |
| 2017/0365247 A1 | 12/2017 | Ushakov |
| 2018/0012077 A1 | 1/2018 | Laska et al. |
| 2018/0033429 A1 | 2/2018 | Makke et al. |
| 2018/0061409 A1 | 3/2018 | Valentine et al. |
| 2018/0096678 A1 | 4/2018 | Zhou et al. |
| 2018/0137857 A1 | 5/2018 | Zhou et al. |
| 2018/0139512 A1 | 5/2018 | Moran et al. |
| 2018/0182410 A1 | 6/2018 | Kaskari et al. |
| 2018/0196776 A1 | 7/2018 | Hershko et al. |
| 2018/0199130 A1 | 7/2018 | Jaffe et al. |
| 2018/0233141 A1 | 8/2018 | Solomon et al. |
| 2018/0260680 A1 | 9/2018 | Finkelstein et al. |
| 2018/0270573 A1 | 9/2018 | Lang et al. |
| 2018/0293221 A1 | 10/2018 | Finkelstein et al. |
| 2018/0301147 A1 | 10/2018 | Kim |
| 2018/0330727 A1 | 11/2018 | Tulli |
| 2018/0336892 A1 | 11/2018 | Kim et al. |
| 2018/0350356 A1 | 12/2018 | Garcia |
| 2018/0350379 A1 | 12/2018 | Wung et al. |
| 2018/0352014 A1 | 12/2018 | Alsina et al. |
| 2018/0352334 A1 | 12/2018 | Family et al. |
| 2018/0358019 A1 | 12/2018 | Mont-Reynaud |
| 2019/0019112 A1 | 1/2019 | Gelfenbeyn et al. |
| 2019/0035404 A1 | 1/2019 | Gabel et al. |
| 2019/0037173 A1 | 1/2019 | Lee |
| 2019/0066680 A1 | 2/2019 | Woo et al. |
| 2019/0066710 A1 | 2/2019 | Bryan et al. |
| 2019/0073999 A1 | 3/2019 | Prémont et al. |
| 2019/0096408 A1 | 3/2019 | Li et al. |
| 2019/0122662 A1 | 4/2019 | Chang et al. |
| 2019/0156847 A1 | 5/2019 | Bryan et al. |
| 2019/0172467 A1 | 6/2019 | Kim et al. |
| 2019/0172476 A1 | 6/2019 | Wung et al. |
| 2019/0186937 A1 | 6/2019 | Sharifi et al. |
| 2019/0188328 A1 | 6/2019 | Oyenan et al. |
| 2019/0189117 A1 | 6/2019 | Kumar |
| 2019/0206405 A1 | 7/2019 | Gillespie et al. |
| 2019/0219976 A1 | 7/2019 | Giorgi et al. |
| 2019/0237089 A1 | 8/2019 | Shin |
| 2019/0251960 A1 | 8/2019 | Maker et al. |
| 2019/0281387 A1 | 9/2019 | Woo et al. |
| 2019/0287536 A1 | 9/2019 | Sharifi et al. |
| 2019/0295555 A1 | 9/2019 | Wilberding |
| 2019/0295556 A1 | 9/2019 | Wilberding |
| 2019/0311715 A1 | 10/2019 | Pfeffinger et al. |
| 2019/0311718 A1 | 10/2019 | Huber et al. |
| 2019/0311722 A1 | 10/2019 | Caldwell |
| 2019/0318729 A1 | 10/2019 | Chao et al. |
| 2019/0325870 A1 | 10/2019 | Mitic |
| 2019/0325888 A1 | 10/2019 | Geng |
| 2019/0341037 A1 | 11/2019 | Bromand et al. |
| 2019/0341038 A1 | 11/2019 | Bromand et al. |
| 2019/0371324 A1 | 12/2019 | Powell et al. |
| 2019/0371342 A1 | 12/2019 | Tukka et al. |
| 2019/0392832 A1 | 12/2019 | Mitsui et al. |
| 2020/0043489 A1 | 2/2020 | Bradley et al. |
| 2020/0098379 A1 | 3/2020 | Tai et al. |
| 2020/0110571 A1 | 4/2020 | Liu et al. |
| 2020/0125162 A1 | 4/2020 | D'Amato et al. |
| 2020/0135194 A1 | 4/2020 | Jeong |
| 2020/0135224 A1 | 4/2020 | Bromand et al. |
| 2020/0152206 A1 | 5/2020 | Shen et al. |
| 2020/0244650 A1 | 7/2020 | Burris et al. |
| 2020/0251107 A1 | 8/2020 | Wang et al. |
| 2020/0342869 A1 | 10/2020 | Lee et al. |
| 2020/0409926 A1 | 12/2020 | Srinivasan et al. |
| 2021/0118439 A1 | 4/2021 | Schillmoeller et al. |
| 2021/0295849 A1 | 9/2021 | Van Der Ven et al. |
| 2021/0358481 A1 | 11/2021 | D'Amato et al. |
| 2022/0036882 A1 | 2/2022 | Ahn et al. |
| 2022/0050585 A1 | 2/2022 | Fettes et al. |
| 2022/0083136 A1 | 3/2022 | DeLeeuw |
| 2022/0301561 A1 | 9/2022 | Robert Jose et al. |

FOREIGN PATENT DOCUMENTS

| | | |
|---|---|---|
| CN | 101427154 A | 5/2009 |
| CN | 102999161 A | 3/2013 |
| CN | 104572009 A | 4/2015 |
| CN | 104885406 A | 9/2015 |
| CN | 104885438 A | 9/2015 |
| CN | 105162886 A | 12/2015 |
| CN | 105284168 A | 1/2016 |
| CN | 105389099 A | 3/2016 |
| CN | 105427861 A | 3/2016 |
| CN | 105453179 A | 3/2016 |
| CN | 105472191 A | 4/2016 |
| CN | 105493179 A | 4/2016 |
| CN | 105632486 A | 6/2016 |
| CN | 106030699 A | 10/2016 |
| CN | 106796784 A | 5/2017 |
| CN | 106910500 A | 6/2017 |
| CN | 107122158 A | 9/2017 |
| CN | 107465974 A | 12/2017 |
| CN | 107644313 A | 1/2018 |
| CN | 107767863 A | 3/2018 |
| CN | 107832837 A | 3/2018 |
| CN | 107919116 A | 4/2018 |
| CN | 108028047 A | 5/2018 |
| CN | 108028048 A | 5/2018 |
| CN | 108198548 A | 6/2018 |
| GB | 2501367 A | 10/2013 |
| JP | 2004109361 A | 4/2004 |
| JP | 2004163590 A | 6/2004 |
| JP | 2007235875 A | 9/2007 |
| JP | 2008217444 A | 9/2008 |
| JP | 2014510481 A | 4/2014 |
| JP | 2016009193 A | 1/2016 |
| JP | 2019109510 A | 7/2019 |
| TW | 201629950 A | 8/2016 |
| WO | 2008096414 A1 | 8/2008 |
| WO | 2015133022 A1 | 9/2015 |
| WO | 2015195216 A1 | 12/2015 |
| WO | 2016003509 A1 | 1/2016 |
| WO | 2016136062 A1 | 9/2016 |

(56) References Cited

FOREIGN PATENT DOCUMENTS

| WO | 2018140777 A1 | 8/2018 |
|---|---|---|
| WO | 2019005772 A1 | 1/2019 |

OTHER PUBLICATIONS

Notice of Allowance dated Apr. 26, 2022, issued in connection with U.S. Appl. No. 17/896,129, filed Aug. 26, 2022, 8 pages.
Notice of Allowance dated Apr. 26, 2023, issued in connection with U.S. Appl. No. 17/658,717, filed Apr. 11, 2022, 11 pages.
Notice of Allowance dated Aug. 26, 2022, issued in connection with U.S. Appl. No. 17/145,667, filed Jan. 11, 2021, 8 pages.
Notice of Allowance dated Oct. 26, 2022, issued in connection with U.S. Appl. No. 17/486,574, filed Sep. 27, 2021, 11 pages.
Notice of Allowance dated Jun. 27, 2022, issued in connection with U.S. Appl. No. 16/812,758, filed Mar. 9, 2020, 16 pages.
Notice of Allowance dated Sep. 28, 2022, issued in connection with U.S. Appl. No. 17/444,043, filed Jul. 29, 2021, 17 pages.
Notice of Allowance dated Dec. 29, 2022, issued in connection with U.S. Appl. No. 17/327,911, filed May 24, 2021, 14 pages.
Notice of Allowance dated Jul. 29, 2022, issued in connection with U.S. Appl. No. 17/236,559, filed Apr. 21, 2021, 6 pages.
Notice of Allowance dated Mar. 29, 2023, issued in connection with U.S. Appl. No. 17/722,438, filed Apr. 18, 2022, 7 pages.
Notice of Allowance dated Mar. 3, 2022, issued in connection with U.S. Appl. No. 16/679,538, filed Nov. 11, 2019, 7 pages.
Notice of Allowance dated Mar. 30, 2023, issued in connection with U.S. Appl. No. 17/303,066, filed May 19, 2021, 7 pages.
Notice of Allowance dated Mar. 31, 2023, issued in connection with U.S. Appl. No. 17/303,735, filed Jun. 7, 2021, 19 pages.
Notice of Allowance dated Apr. 5, 2023, issued in connection with U.S. Appl. No. 17/549,253, filed Dec. 13, 2021, 10 pages.
Notice of Allowance dated Mar. 6, 2023, issued in connection with U.S. Appl. No. 17/449,926, filed Oct. 4, 2021, 8 pages.
Notice of Allowance dated Apr. 8, 2022, issued in connection with U.S. Appl. No. 16/813,643, filed Mar. 9, 2020, 7 pages.
Simon Doclo et al. Combined Acoustic Echo and Noise Reduction Using GSVD-Based Optimal Filtering. In 2000 IEEE International Conference on Acoustics, Speech, and Signal Processing. Proceedings (Cat. No. 00CH37100), Aug. 6, 2002, 4 pages. [retrieved on Feb. 23, 2023], Retrieved from the Internet: URL: https://scholar.google.com/scholar?hl=en&as_sdt=0%2C14&q=COMBINED+ACOUSTIC+ECHO+AND+NOISE+REDUCTION+USING+GSVD-BASED+OPTIMAL+FILTERING&btnG=.
Wikipedia. "The Wayback Machine", Speech recognition software for Linux, Sep. 22, 2016, 4 pages. [retrieved on Mar. 28, 2022], Retrieved from the Internet: URL: https://web.archive.org/web/20160922151304/https://en.wikipedia.org/wiki/Speech_recognition_software_for_Linux.
Wolf et al. On the potential of channel selection for recognition of reverberated speech with multiple microphones. Interspeech, TALP Research Center, Jan. 2010, 5 pages.
Wölfel et al. Multi-source far-distance microphone selection and combination for automatic transcription of lectures, Interspeech 2006—ICSLP, Jan. 2006, 5 pages.
Zhang et al. Noise Robust Speech Recognition Using Multi-Channel Based Channel Selection and Channel Weighting. The Institute of Electronics, Information and Communication Engineers, arXiv:1604.03276v1 [cs.SD] Jan. 1, 2010, 8 pages.
International Bureau, International Preliminary Report on Patentability, dated Jul. 21, 2022, issued in connection with International Application No. PCT/US2021/070007, filed on Jan. 6, 2021, 8 pages.
International Bureau, International Preliminary Report on Patentability, dated Apr. 26, 2022, issued in connection with International Application No. PCT/US2020/056632, filed on Oct. 21, 2020, 7 pages.
International Bureau, International Search Report and Written Opinion dated Mar. 20, 2023, issued in connection with International Application No. PCT/US2022/045399, filed on Sep. 30, 2022, 25 pages.
International Searching Authority, Invitation to Pay Additional Fees dated Jan. 27, 2023, issued in connection with International Application No. PCT/US2022/045399, filed on Sep. 30, 2022, 19 pages.
Japanese Patent Office, Decision of Refusal and Translation dated Oct. 4, 2022, issued in connection with Japanese Patent Application No. 2021-535871, 6 pages.
Japanese Patent Office, Decision of Refusal and Translation dated May 23, 2023, issued in connection with Japanese Patent Application No. 2021-163622, 13 pages.
Japanese Patent Office, Decision of Refusal and Translation dated Jul. 26, 2022, issued in connection with Japanese Patent Application No. 2020-513852, 10 pages.
Japanese Patent Office, Non-Final Office Action dated Apr. 4, 2023, issued in connection with Japanese Patent Application No. 2021-573944, 5 pages.
Japanese Patent Office, Notice of Reasons for Refusal and Translation dated Sep. 13, 2022, issued in connection with Japanese Patent Application No. 2021-163622, 12 pages.
Japanese Patent Office, Office Action and Translation dated Nov. 15, 2022, issued in connection with Japanese Patent Application No. 2021-146144, 9 pages.
Japanese Patent Office, Office Action dated Nov. 29, 2022, issued in connection with Japanese Patent Application No. 2021-181224, 6 pages.
Katsamanis et al. Robust far-field spoken command recognition for home automation combining adaptation and multichannel processing. ICASSP, IEEE International Conference on Acoustics, Speech and Signal Processing—Proceedings, May 2014, pp. 5547-5551.
Korean Patent Office, Korean Examination Report and Translation dated Apr. 10, 2023, issued in connection with Korean Application No. 10-2022-7024007, 8 pages.
Korean Patent Office, Korean Examination Report and Translation dated Oct. 13, 2022, issued in connection with Korean Application No. 10-2021-7030939, 4 pages.
Korean Patent Office, Korean Examination Report and Translation dated Apr. 19, 2022, issued in connection with Korean Application No. 10-2021-7008937, 14 pages.
Korean Patent Office, Korean Examination Report and Translation dated Jul. 26, 2022, issued in connection with Korean Application No. 10-2022-7016656, 17 pages.
Korean Patent Office, Korean Examination Report and Translation dated Mar. 31, 2023, issued in connection with Korean Application No. 10-2022-7016656, 7 pages.
Korean Patent Office, Korean Examination Report and Translation dated Oct. 31, 2021, issued in connection with Korean Application No. 10-2022-7024007, 10 pages.
Korean Patent Office, Office Action and Translation dated Feb. 27, 2023, issued in connection with Korean Application No. 10-2022-7021879, 5 pages.
Mathias Wolfel. Channel Selection by Class Separability Measures for Automatic Transcriptions on Distant Microphones, Interspeech 2007 10.21437/Interspeech.2007-255, 4 pages.
Non-Final Office Action dated Feb. 2, 2023, issued in connection with U.S. Appl. No. 17/305,698, filed Jul. 13, 2021, 16 pages.
Non-Final Office Action dated Dec. 5, 2022, issued in connection with U.S. Appl. No. 17/662,302, filed May 6, 2022, 12 pages.
Non-Final Office Action dated Oct. 5, 2022, issued in connection with U.S. Appl. No. 17/449,926, filed Oct. 4, 2021, 11 pages.
Non-Final Office Action dated Apr. 12, 2023, issued in connection with U.S. Appl. No. 17/878,649, filed Aug. 1, 2022, 16 pages.
Non-Final Office Action dated Nov. 14, 2022, issued in connection with U.S. Appl. No. 17/077,974, filed Oct. 22, 2020, 6 pages.
Non-Final Office Action dated Sep. 14, 2022, issued in connection with U.S. Appl. No. 17/446,690, filed Sep. 1, 2021, 10 pages.
Non-Final Office Action dated Aug. 15, 2022, issued in connection with U.S. Appl. No. 17/448,015, filed Sep. 17, 2021, 12 pages.
Non-Final Office Action dated Dec. 15, 2022, issued in connection with U.S. Appl. No. 17/549,253, filed Dec. 13, 2021, 10 pages.

(56) References Cited

OTHER PUBLICATIONS

Non-Final Office Action dated Feb. 15, 2023, issued in connection with U.S. Appl. No. 17/453,632, filed Nov. 4, 2021, 12 pages.
Non-Final Office Action dated Sep. 15, 2022, issued in connection with U.S. Appl. No. 17/247,507, filed Dec. 14, 2020, 9 pages.
Non-Final Office Action dated Sep. 15, 2022, issued in connection with U.S. Appl. No. 17/327,911, filed May 24, 2021, 44 pages.
Non-Final Office Action dated Feb. 16, 2023, issued in connection with U.S. Appl. No. 17/305,920, filed Jul. 16, 2021, 12 pages.
Non-Final Office Action dated Oct. 18, 2022, issued in connection with U.S. Appl. No. 16/949,973, filed Nov. 23, 2020, 31 pages.
Non-Final Office Action dated Sep. 19, 2022, issued in connection with U.S. Appl. No. 17/385,542, filed Jul. 26, 2021, 9 pages.
Non-Final Office Action dated Apr. 20, 2023, issued in connection with U.S. Appl. No. 18/061,570, filed Dec. 5, 2022, 12 pages.
Non-Final Office Action dated Oct. 20, 2022, issued in connection with U.S. Appl. No. 17/532,674, filed Nov. 22, 2021, 52 pages.
Non-Final Office Action dated Dec. 22, 2022, issued in connection with U.S. Appl. No. 16/168,389, filed Oct. 23, 2018, 39 pages.
Non-Final Office Action dated Mar. 23, 2022, issued in connection with U.S. Appl. No. 16/907,953, filed Jun. 22, 2020, 7 pages.
Non-Final Office Action dated Sep. 23, 2022, issued in connection with U.S. Appl. No. 16/153,530, filed Oct. 5, 2018, 25 pages.
Non-Final Office Action dated Apr. 24, 2023, issued in connection with U.S. Appl. No. 17/532,744, filed Nov. 22, 2021, 18 pages.
Non-Final Office Action dated May 24, 2022, issued in connection with U.S. Appl. No. 17/101,949, filed Nov. 23, 2020, 10 pages.
Non-Final Office Action dated Apr. 25, 2023, issued in connection with U.S. Appl. No. 17/536,572, filed Nov. 29, 2021, 8 pages.
Non-Final Office Action dated Apr. 25, 2023, issued in connection with U.S. Appl. No. 17/656,794, filed Mar. 28, 2022, 22 pages.
Non-Final Office Action dated May 25, 2023, issued in connection with U.S. Appl. No. 18/157,937, filed Jan. 23, 2023, 9 pages.
Non-Final Office Action dated Oct. 25, 2022, issued in connection with U.S. Appl. No. 17/549,034, filed Dec. 13, 2021, 20 pages.
Non-Final Office Action dated May 26, 2022, issued in connection with U.S. Appl. No. 16/989,805, filed Aug. 10, 2020, 14 pages.
Non-Final Office Action dated Oct. 26, 2021, issued in connection with U.S. Appl. No. 16/736,725, filed Jan. 7, 2020, 12 pages.
Non-Final Office Action dated Feb. 27, 2023, issued in connection with U.S. Appl. No. 17/493,430, filed Oct. 4, 2021, 17 pages.
Non-Final Office Action dated Feb. 28, 2023, issued in connection with U.S. Appl. No. 17/548,921, filed Dec. 13, 2021, 12 pages.
Non-Final Office Action dated Mar. 28, 2022, issued in connection with U.S. Appl. No. 17/222,151, filed Apr. 5, 2021, 5 pages.
Advisory Action dated Nov. 7, 2022, issued in connection with U.S. Appl. No. 16/168,389, filed Oct. 23, 2018, 4 pages.
Advisory Action dated Feb. 28, 2022, issued in connection with U.S. Appl. No. 16/813,643, filed Mar. 9, 2020, 3 pages.
Australian Patent Office, Australian Examination Report Action dated Nov. 10, 2022, issued in connection with Australian Application No. 2018312989, 2 pages.
Australian Patent Office, Australian Examination Report Action dated May 19, 2022, issued in connection with Australian Application No. 2021212112, 2 pages.
Australian Patent Office, Australian Examination Report Action dated Sep. 28, 2022, issued in connection with Australian Application No. 2018338812, 3 pages.
Australian Patent Office, Australian Examination Report Action dated Mar. 4, 2022, issued in connection with Australian Application No. 2021202786, 2 pages.
Canadian Patent Office, Canadian Examination Report dated Sep. 14, 2022, issued in connection with Canadian Application No. 3067776, 4 pages.
Canadian Patent Office, Canadian Examination Report dated Oct. 19, 2022, issued in connection with Canadian Application No. 3123601, 5 pages.
Canadian Patent Office, Canadian Examination Report dated Mar. 29, 2022, issued in connection with Canadian Application No. 3111322, 3 pages.
Canadian Patent Office, Canadian Examination Report dated Jun. 7, 2022, issued in connection with Canadian Application No. 3105494, 5 pages.
Chinese Patent Office, First Office Action and Translation dated Jun. 1, 2021, issued in connection with Chinese Application No. 201980089721.5, 21 pages.
Chinese Patent Office, First Office Action and Translation dated Feb. 9, 2023, issued in connection with Chinese Application No. 201880076788.0, 13 pages.
Chinese Patent Office, First Office Action and Translation dated Oct. 9, 2022, issued in connection with Chinese Application No. 201780056695.7, 10 pages.
Chinese Patent Office, First Office Action and Translation dated Nov. 10, 2022, issued in connection with Chinese Application No. 201980070006.7, 15 pages.
Chinese Patent Office, First Office Action and Translation dated Jan. 19, 2023, issued in connection with Chinese Application No. 201880064916.X, 10 pages.
Chinese Patent Office, First Office Action and Translation dated Sep. 19, 2022, issued in connection with Chinese Application No. 201980056604.9, 13 pages.
Chinese Patent Office, First Office Action and Translation dated Nov. 25, 2022, issued in connection with Chinese Application No. 201780056321.5, 8 pages.
Chinese Patent Office, First Office Action and Translation dated Feb. 27, 2023, issued in connection with Chinese Application No. 201980003798.6, 12 pages.
Chinese Patent Office, First Office Action and Translation dated Dec. 30, 2022, issued in connection with Chinese Application No. 201880076775.3, 10 pages.
Chinese Patent Office, Second Office Action and Translation dated Mar. 3, 2022, issued in connection with Chinese Application No. 201880077216.4, 11 pages.
Chinese Patent Office, Second Office Action and Translation dated Apr. 1, 2023, issued in connection with Chinese Application No. 201980056604.9, 11 pages.
Chinese Patent Office, Second Office Action dated Dec. 21, 2022, issued in connection with Chinese Application No. 201980089721.5, 12 pages.
Chinese Patent Office, Second Office Action dated May 30, 2023, issued in connection with Chinese Application No. 201980070006.7, 9 pages.
European Patent Office, Decision to Refuse European Patent Application dated May 30, 2022, issued in connection with European Application No. 17200837.7, 4 pages.
European Patent Office, European EPC Article 94.3 mailed on Jun. 5, 2023, issued in connection with European Application No. 20710649.3, 8 pages.
European Patent Office, European EPC Article 94.3 mailed on Feb. 10, 2023, issued in connection with European Application No. 19729968.8, 7 pages.
European Patent Office, European EPC Article 94.3 mailed on Mar. 11, 2022, issued in connection with European Application No. 19731415.6, 7 pages.
European Patent Office, European EPC Article 94.3 mailed on May 2, 2022, issued in connection with European Application No. 20185599.6, 7 pages.
European Patent Office, European EPC Article 94.3 mailed on Jun. 21, 2022, issued in connection with European Application No. 19780508.8, 5 pages.
European Patent Office, European EPC Article 94.3 mailed on Feb. 23, 2023, issued in connection with European Application No. 19839734.1, 8 pages.
European Patent Office, European EPC Article 94.3 mailed on Nov. 28, 2022, issued in connection with European Application No. 18789515.6, 7 pages.
European Patent Office, European EPC Article 94.3 mailed on Mar. 3, 2022, issued in connection with European Application No. 19740292.8, 10 pages.
European Patent Office, European EPC Article 94.3 mailed on Jun. 30, 2022, issued in connection with European Application No. 19765953.5, 4 pages.

(56) References Cited

OTHER PUBLICATIONS

European Patent Office, European Extended Search Report dated Oct. 7, 2022, issued in connection with European Application No. 22182193.7, 8 pages.
European Patent Office, European Extended Search Report dated Apr. 22, 2022, issued in connection with European Application No. 21195031.6, 14 pages.
European Patent Office, European Extended Search Report dated Jun. 23, 2022, issued in connection with European Application No. 22153180.9, 6 pages.
European Patent Office, European Extended Search Report dated Jun. 30, 2022, issued in connection with European Application No. 21212763.3, 9 pages.
European Patent Office, European Extended Search Report dated Jul. 8, 2022, issued in connection with European Application No. 22153523.0, 9 pages.
European Patent Office, European Search Report dated Mar. 1, 2022, issued in connection with European Application No. 21180778.9, 9 pages.
European Patent Office, European Search Report dated Oct. 4, 2022, issued in connection with European Application No. 22180226.7, 6 pages.
European Patent Office, Summons to Attend Oral Proceedings mailed on Jul. 15, 2022, issued in connection with European Application No. 17792272.1, 11 pages.
Final Office Action dated Jun. 1, 2022, issued in connection with U.S. Appl. No. 16/806,747, filed Mar. 2, 2020, 20 pages.
Final Office Action dated Aug. 17, 2022, issued in connection with U.S. Appl. No. 16/179,779, filed Nov. 2, 2018, 26 pages.
Final Office Action dated May 17, 2023, issued in connection with U.S. Appl. No. 16/168,389, filed Oct. 23, 2018, 44 pages.
Final Office Action dated Mar. 21, 2022, issued in connection with U.S. Appl. No. 16/153,530, filed Oct. 6, 2018, 23 pages.
Final Office Action dated Aug. 22, 2022, issued in connection with U.S. Appl. No. 16/168,389, filed Oct. 23, 2018, 37 pages.
Final Office Action dated Jul. 27, 2022, issued in connection with U.S. Appl. No. 16/989,350, filed Aug. 10, 2020, 15 pages.
Final Office Action dated Mar. 29, 2023, issued in connection with U.S. Appl. No. 17/549,034, filed Dec. 13, 2021, 21 pages.
Final Office Action dated Jun. 7, 2022, issued in connection with U.S. Appl. No. 16/736,725, filed Jan. 7, 2020, 14 pages.
Helwani et al. Source-domain adaptive filtering for MIMO systems with application to acoustic echo cancellation. In 2010 IEEE International Conference on Acoustics, Speech and Signal Processing, Jun. 28, 2010, 4 pages. [retrieved on Feb. 23, 2023], Retrieved from the Internet: URL: https://scholar.google.com/scholar?hl=en&as_sdt=0% 2C14&q=SOURCE-DOMAIN+ADAPTIVE+FILTERING+FOR+MIMO+SYSTEMS+WITH+APPLICATION+TO+ACOUSTIC+ECHO+CANCELLATION&btnG=.
Non-Final Office Action dated Sep. 30, 2022, issued in connection with U.S. Appl. No. 17/353,254, filed Jun. 21, 2021, 22 pages.
Non-Final Office Action dated Nov. 4, 2022, issued in connection with U.S. Appl. No. 17/445,272, filed Aug. 17, 2021, 22 pages.
Non-Final Office Action dated Oct. 4, 2022, issued in connection with U.S. Appl. No. 16/915,234, filed Jun. 29, 2020, 16 pages.
Non-Final Office Action dated Apr. 5, 2023, issued in connection with U.S. Appl. No. 18/145,501, filed Dec. 22, 2022, 6 pages.
Non-Final Office Action dated Feb. 7, 2023, issued in connection with U.S. Appl. No. 17/303,001, filed May 18, 2021, 8 pages.
Non-Final Office Action dated Jun. 7, 2023, issued in connection with U.S. Appl. No. 16/179,779, filed Nov. 2, 2018, 29 pages.
Non-Final Office Action dated Mar. 7, 2022, issued in connection with U.S. Appl. No. 16/812,758, filed Mar. 9, 2020, 18 pages.
Non-Final Office Action dated Jun. 8, 2023, issued in connection with U.S. Appl. No. 18/048,034, filed Oct. 20, 2022, 8 pages.
Non-Final Office Action dated Jun. 8, 2023, issued in connection with U.S. Appl. No. 18/061,243, filed Dec. 2, 2022, 10 pages.
Notice of Allowance dated Nov. 2, 2022, issued in connection with U.S. Appl. No. 16/989,805, filed Aug. 10, 2020, 5 pages.
Notice of Allowance dated Nov. 3, 2022, issued in connection with U.S. Appl. No. 17/448,015, filed Sep. 17, 2021, 7 pages.
Notice of Allowance dated Feb. 6, 2023, issued in connection with U.S. Appl. No. 17/077,974, filed Oct. 22, 2020, 7 pages.
Notice of Allowance dated Jan. 6, 2023, issued in connection with U.S. Appl. No. 17/896,129, filed Aug. 26, 2022, 13 pages.
Notice of Allowance dated Dec. 7, 2022, issued in connection with U.S. Appl. No. 17/315,599, filed May 10, 2021, 11 pages.
Notice of Allowance dated Feb. 8, 2023, issued in connection with U.S. Appl. No. 17/446,690, filed Sep. 1, 2021, 8 pages.
Notice of Allowance dated Jan. 9, 2023, issued in connection with U.S. Appl. No. 17/247,507, filed Dec. 14, 2020, 8 pages.
Notice of Allowance dated Jun. 9, 2023, issued in connection with U.S. Appl. No. 17/532,674, filed Nov. 22, 2021, 13 pages.
Notice of Allowance dated Mar. 9, 2023, issued in connection with U.S. Appl. No. 17/662,302, filed May 6, 2022, 7 pages.
Notice of Allowance dated Nov. 9, 2022, issued in connection with U.S. Appl. No. 17/385,542, filed Jul. 26, 2021, 8 pages.
Notice of Allowance dated Mar. 1, 2022, issued in connection with U.S. Appl. No. 16/879,549, filed May 20, 2020, 9 pages.
Notice of Allowance dated Jun. 10, 2022, issued in connection with U.S. Appl. No. 16/879,549, filed May 20, 2020, 8 pages.
Notice of Allowance dated May 11, 2022, issued in connection with U.S. Appl. No. 17/135,123, filed Dec. 28, 2020, 8 pages.
Notice of Allowance dated May 11, 2022, issued in connection with U.S. Appl. No. 17/145,667, filed Jan. 11, 2021, 7 pages.
Notice of Allowance dated May 11, 2023, issued in connection with U.S. Appl. No. 18/061,638, filed Dec. 5, 2022, 15 pages.
Notice of Allowance dated May 11, 2023, issued in connection with U.S. Appl. No. 18/061,638, filed Dec. 6, 2022, 15 pages.
Notice of Allowance dated Jul. 12, 2022, issued in connection with U.S. Appl. No. 16/907,953, filed Jun. 22, 2020, 8 pages.
Notice of Allowance dated Jul. 12, 2022, issued in connection with U.S. Appl. No. 17/391,404, filed Aug. 2, 2021, 13 pages.
Notice of Allowance dated Jun. 12, 2023, issued in connection with U.S. Appl. No. 17/453,632, filed Nov. 4, 2021, 9 pages.
Notice of Allowance dated Apr. 13, 2022, issued in connection with U.S. Appl. No. 17/236,559, filed Apr. 21, 2021, 7 pages.
Notice of Allowance dated Feb. 13, 2023, issued in connection with U.S. Appl. No. 18/045,360, filed Oct. 10, 2022, 9 pages.
Notice of Allowance dated Jun. 13, 2023, issued in connection with U.S. Appl. No. 17/249,776, filed Mar. 12, 2021, 10 pages.
Notice of Allowance dated Aug. 15, 2022, issued in connection with U.S. Appl. No. 17/101,949, filed Nov. 23, 2020, 11 pages.
Notice of Allowance dated Feb. 15, 2023, issued in connection with U.S. Appl. No. 17/659,613, filed Apr. 18, 2022, 21 pages.
Notice of Allowance dated Jun. 15, 2023, issued in connection with U.S. Appl. No. 17/305,698, filed Jul. 13, 2021, 8 pages.
Notice of Allowance dated Jun. 15, 2023, issued in connection with U.S. Appl. No. 17/305,920, filed Jul. 16, 2021, 8 pages.
Notice of Allowance dated Sep. 15, 2022, issued in connection with U.S. Appl. No. 16/736,725 , filed Jan. 1, 2020, 11 pages.
Notice of Allowance dated Aug. 17, 2022, issued in connection with U.S. Appl. No. 17/135,347, filed Dec. 28, 2020, 14 pages.
Notice of Allowance dated Nov. 17, 2022, issued in connection with U.S. Appl. No. 17/486,222, filed Sep. 27, 2021, 10 pages.
Notice of Allowance dated Jul. 18, 2022, issued in connection with U.S. Appl. No. 17/222,151, filed Apr. 5, 2021, 5 pages.
Notice of Allowance dated Dec. 20, 2022, issued in connection with U.S. Appl. No. 16/806,747, filed Mar. 2, 2020, 5 pages.
Notice of Allowance dated Jan. 20, 2023, issued in connection with U.S. Appl. No. 16/915,234, filed Jun. 29, 2020, 6 pages.
Notice of Allowance dated Jun. 20, 2022, issued in connection with U.S. Appl. No. 16/947,895, filed Aug. 24, 2020, 7 pages.
Notice of Allowance dated Mar. 20, 2023, issued in connection with U.S. Appl. No. 17/562,412, filed Dec. 27, 2021, 9 pages.
Notice of Allowance dated Mar. 21, 2023, issued in connection with U.S. Appl. No. 17/353,254, filed Jun. 21, 2021, 8 pages.
Notice of Allowance dated Nov. 21, 2022, issued in connection with U.S. Appl. No. 17/454,676, filed Nov. 12, 2021, 8 pages.
Notice of Allowance dated Sep. 21, 2022, issued in connection with U.S. Appl. No. 17/128,949, filed Dec. 21, 2020, 8 pages.

(56) References Cited

OTHER PUBLICATIONS

Notice of Allowance dated Sep. 22, 2022, issued in connection with U.S. Appl. No. 17/163,506, filed Jan. 31, 2021, 13 pages.
Notice of Allowance dated Sep. 22, 2022, issued in connection with U.S. Appl. No. 17/248,427, filed Jan. 25, 2021, 9 pages.
Notice of Allowance dated Feb. 23, 2023, issued in connection with U.S. Appl. No. 17/532,674, filed Nov. 22, 2021, 10 pages.

* cited by examiner

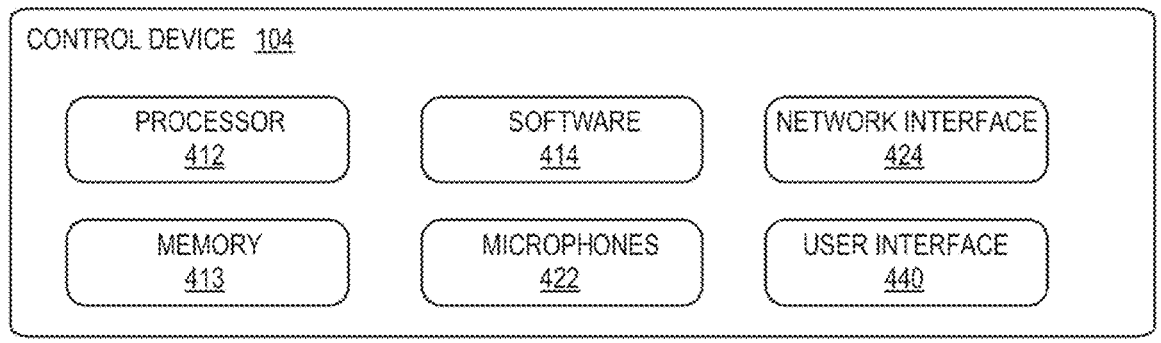
Fig. 4
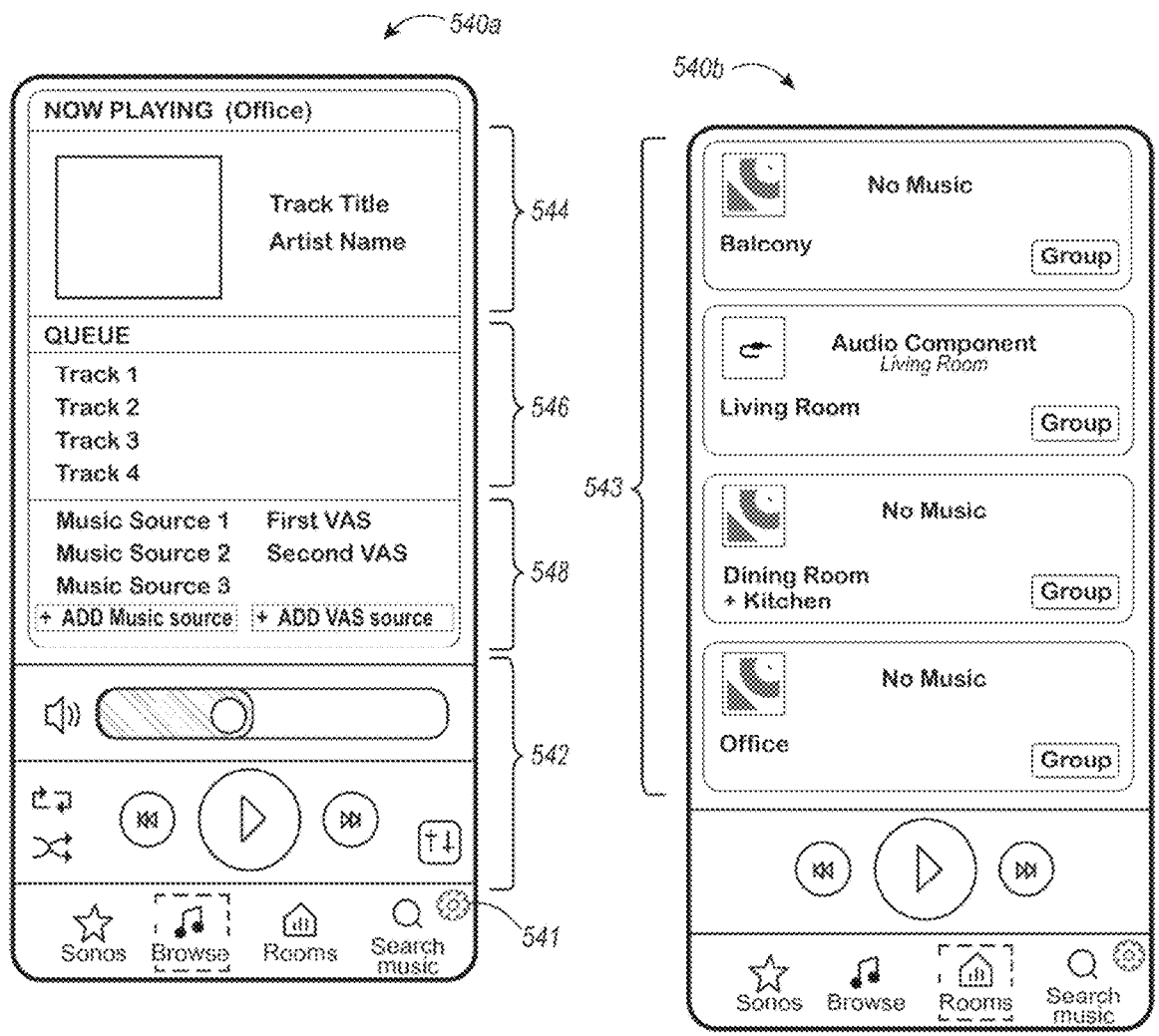
Fig. 5A
Fig. 5B

VOICE VERIFICATION FOR MEDIA PLAYBACK

CROSS-REFERENCE TO RELATED APPLICATION

This application is a continuation of U.S. patent application Ser. No. 16/736,725, filed Jan. 7, 2020, which is incorporated herein by reference in its entirety.

FIELD OF THE DISCLOSURE

The present technology relates to consumer goods and, more particularly, to methods, systems, products, features, services, and other elements directed to voice-assisted control of media playback systems or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 4 is a functional block diagram of an example controller device in accordance with aspects of the disclosure.

FIGS. 5A and 5B are controller interfaces in accordance with aspects of the disclosure.

Figure 1A:
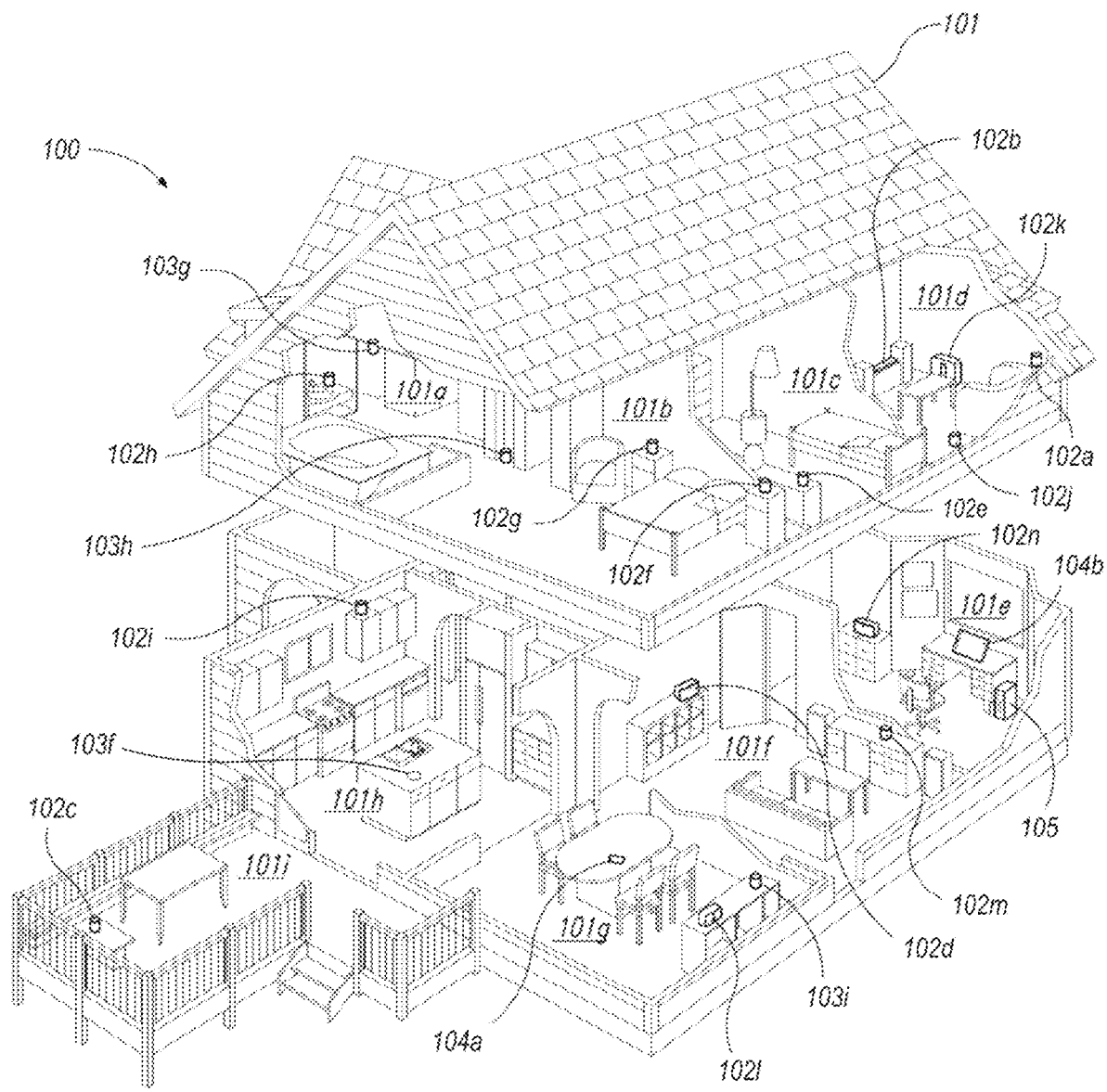
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

Network microphone devices may be used facilitate voice control of smart home devices, such as wireless audio playback devices, illumination devices, appliances, and home-automation devices (e.g., thermostats, door locks, etc.). An NMD is a networked computing device that typically includes an arrangement of microphones, such as a microphone array, that is configured to detect sound present in the NMD's environment. In some examples, an NMD may be implemented within another device, such as an audio playback device.

A voice input to such an NMD will typically include a wake word followed by an utterance comprising a user request. In practice, a wake word is typically a predetermined nonce word or phrase used to "wake up" an NMD and cause it to invoke a particular voice assistant service ("VAS") to interpret the intent of voice input in detected sound. For example, a user might speak the wake word "Alexa" to invoke the AMAZON® VAS, "Ok, Google" to invoke the GOOGLE® VAS, "Hey, Siri" to invoke the APPLE® VAS, or "Hey, Sonos" to invoke a VAS offered by SONOS®, among other examples. In practice, a wake word may also be referred to as, for example, an activation-, trigger-, wakeup-word or -phrase, and may take the form of any suitable word, combination of words (e.g., a particular phrase), and/or some other audio cue.

To identify whether sound detected by the NMD contains a voice input that includes a particular wake word, NMDs often utilize a wake-word engine, which is typically onboard the NMD. The wake-word engine may be configured to identify (i.e., "spot" or "detect") a particular wake word in recorded audio using one or more identification algorithms. Such identification algorithms may include pattern recognition trained to detect the frequency and/or time domain patterns that speaking the wake word creates. This wake-word identification process is commonly referred to as "keyword spotting." In practice, to help facilitate keyword spotting, the NMD may buffer sound detected by a microphone of the NMD and then use the wake-word engine to process that buffered sound to determine whether a wake word is present in the recorded audio.

When a wake-word engine detects a wake word in recorded audio, the NMD may determine that a wake-word event (i.e., a "wake-word trigger") has occurred, which indicates that the NMD has detected sound that includes a potential voice input. The occurrence of the wake-word event typically causes the NMD to perform additional processes involving the detected sound. These additional processes may include extracting detected-sound data from a buffer, among other possible additional processes, such as outputting an alert (e.g., an audible chime and/or a light indicator) indicating that a wake word has been identified. Extracting the detected sound may include reading out and packaging a stream of the detected-sound according to a particular format and transmitting the packaged sound-data to an appropriate VAS for interpretation.

In turn, the VAS corresponding to the wake word that was identified by the wake-word engine receives the transmitted sound data from the NMD over a communication network. A VAS traditionally takes the form of a remote service implemented using one or more cloud servers configured to process voice inputs (e.g., AMAZON's ALEXA, APPLE's SIRI, MICROSOFT's CORTANA, GOOGLE'S ASSISTANT, etc.). In some instances, certain components and functionality of the VAS may be distributed across local and remote devices.

When a VAS receives detected-sound data, the VAS processes this data, which involves identifying the voice input and determining intent of words captured in the voice input. The VAS may then provide a response back to the NMD with some instruction according to the determined intent. Based on that instruction, the NMD may cause one or more smart devices to perform an action. For example, in accordance with an instruction from a VAS, an NMD may cause a playback device to play a particular song or an illumination device to turn on/off, among other examples. In some cases, an NMD, or a media system with NMDs (e.g., a media playback system with NMD-equipped playback devices) may be configured to interact with multiple VASes. In practice, the NMD may select one VAS over another based on the particular wake word identified in the sound detected by the NMD.

In operation, the NMD is exposed to a variety of voice inputs from different speakers. In a home environment, for example, the NMD may capture voice inputs from different members of the household as well as voice inputs from houseguests, a television program, and other sources. In some cases, it may be desirable to limit the amount of control that certain speakers (or listeners) may have over media being played back by an NMD. For example, a host may not want their guests changing the volume of the music playing. As described in greater detail below, various techniques and devices disclosed herein are configured to utilize verification information, such as voice biometrics, to verify voice commands affecting media playback and functionally disable or alter any commands received from unverified users. As used herein with respect to the processing of voice inputs for control of media playback, "verification" of a voice input refers to authentication of the voice input, authorization of the voice input, validation of the voice input, and/or other suitable verification methods.

According to several embodiments of the present technology, the analysis of whether a speaker is verified occurs independently of wake word detection and sending requests related to the command to the VAS. As such, the systems and methods of the present technology are configured to verify a playback command in a voice input without involvement from a VAS. This way, a user of the NMD can set controls for media playback by interacting only with the NMD or media playback system and without the extra step of programming the VAS or performing voice verification with the VAS. Likewise, the methods and systems of the present technology provide the user with a greater degree of privacy by verifying the voice input locally and without the raw recording and/or certain other user data (e.g., the user's biometric data) being sent to one or more remote computing devices associated with a voice verification service.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

II. Example Operation Environment

Figure 1B:
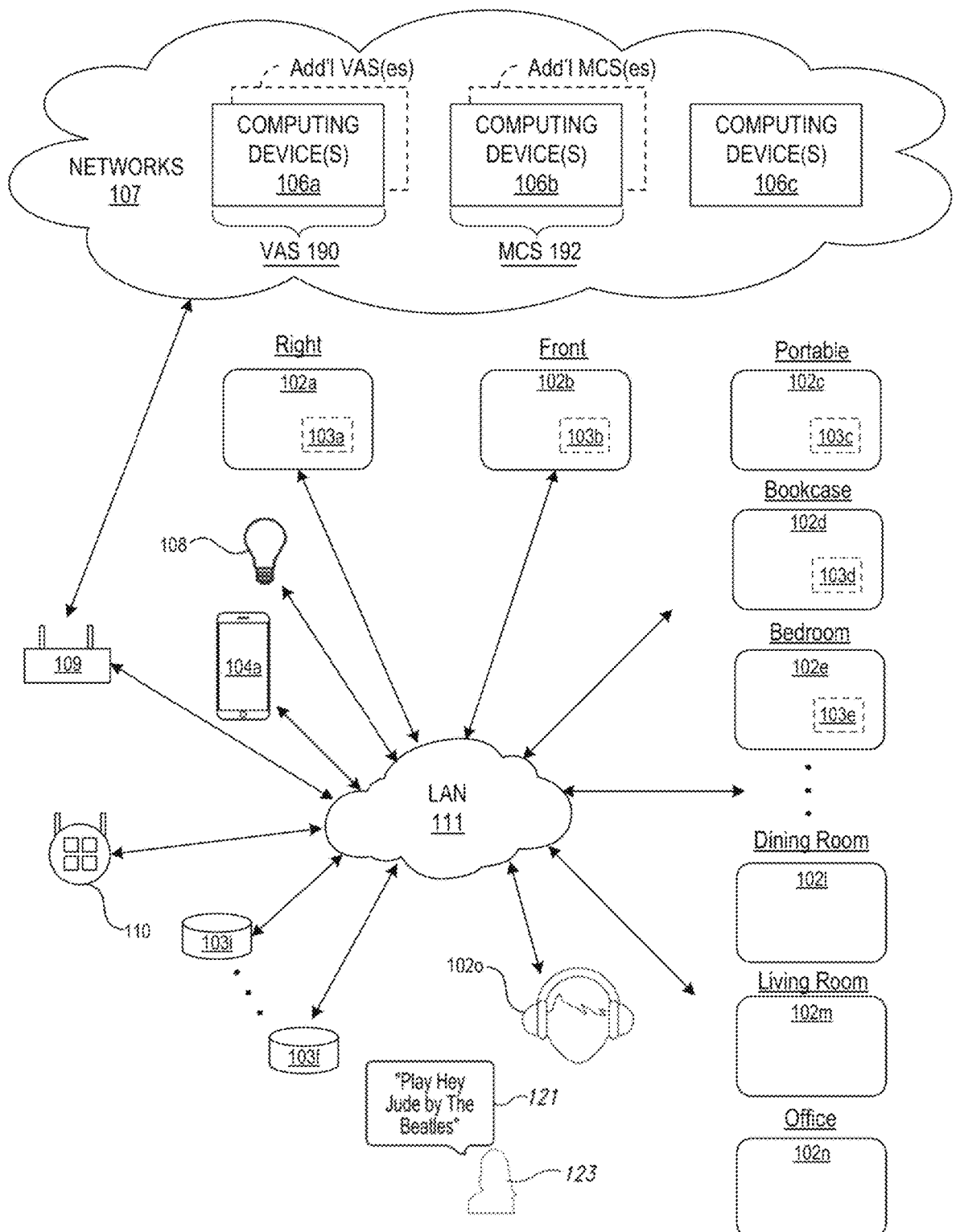
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101*a*, a master bedroom 101*b*, (referred to herein as "Nick's Room"), a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102*a*-102*o*), network microphone devices 103 (identified individually as "NMDs" 103*a*-102*i*), and controller devices 104*a* and 104*b* (collectively "controller devices 104").

Referring to FIG. 1B, the home environment may include additional and/or other computing devices, including local network devices, such as one or more smart illumination devices 108 (FIG. 1B), a smart alarm (not shown), a smart thermostat 110, and a local computing device 105 (FIG. 1A). In embodiments described below, one or more of the various playback devices 102 may be configured as portable playback devices, while others may be configured as stationary playback devices. For example, the headphones 102o (FIG. 1B) are a portable playback device, while the playback device 102d on the bookcase may be a stationary device. As another example, the playback device 102c on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102, 103, and 104 and/or other network devices of the MPS 100 may be coupled to one another via point-to-point connections and/or over other connections, which may be wired and/or wireless, via a network 111, such as a LAN including a network router 109. For example, the playback device 102j in the Den 101d (FIG. 1A), which may be designated as the "Left" device, may have a point-to-point connection with the playback device 102a, which is also in the Den 101d and may be designated as the "Right" device. In a related embodiment, the Left playback device 102j may communicate with other network devices, such as the playback device 102b, which may be designated as the "Front" device, via a point-to-point connection and/or other connections via the NETWORK 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106 are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 102 may take the form of or include an on-board (e.g., integrated) network microphone device. For example, the playback devices 102a-e include or are otherwise equipped with corresponding NMDs 103a-e, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103f and 103g may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102d because it is physically situated on a bookcase. Similarly, the NMD 103f may be assigned the named "Island" because it is physically situated on an island countertop in the Kitchen 101h (FIG. 1A). Some playback devices may be assigned names according to a zone or room, such as the playback devices 102e, 102l, 102m, and 102n, which are named "Bedroom," "Dining Room," "Living Room," and "Office," respectively. Further, certain playback devices may have functionally descriptive names. For example, the playback devices 102a and 102b are assigned the names "Right" and "Front," respectively, because these two devices are configured to provide specific audio channels during media playback in the zone of the Den 101d (FIG. 1A). The playback device 102c in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the network 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102*d* in the environment 101 (FIG. 1A) is in relatively close proximity to the NMD-equipped Living Room playback device 102*m*, and both devices 102*d* and 102*m* may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103*f* in the Kitchen 101*h* (FIG. 1A) may be assigned to the Dining Room playback device 102*l*, which is in relatively close proximity to the Island NMD 103*f*. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application Ser. No. 15/438,749.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the NETWORK 111 (FIG. 1B) may be eliminated and the single playback device 102 and/or the single NMD 103 may communicate directly with the remote computing devices 106-*d*. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
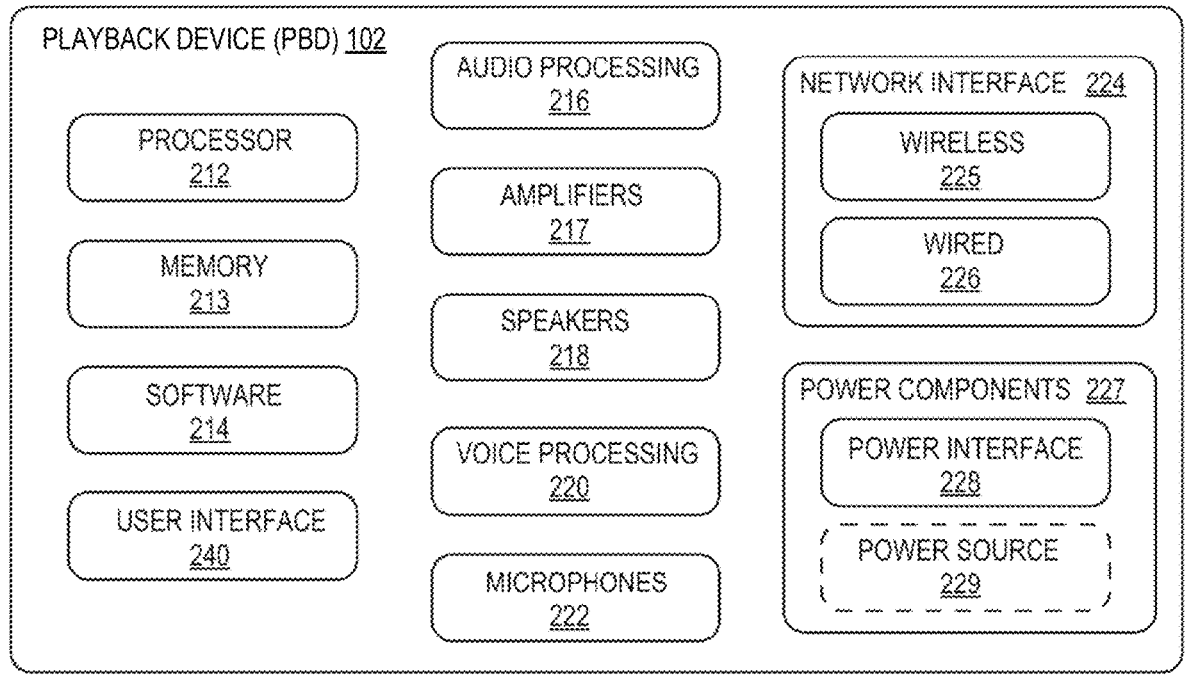
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processors (e.g., components configured to recognize a voice of a particular user or a particular set of users associated with a household), among other example voice processing components. In some embodiments, the voice processing components 220 may include a speech processor configured to analyze a voice input and derive verification information, such as biometric information, from the voice input. The MPS 100 and/or playback device 102 may use the verification information, for example, to determine whether the voice input was spoken by a verified user. If not, the MPS 100 and/or playback device 102 may functionally disable any commands contained within the voice input, as described in greater detail below. For example, the NMD may be functionally disabled from performing one or more commands contained within the voice input.

In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212. As described in more detail below, in some embodiments voice processing components 220 can be configured to detect and/or classify noise in input sound data.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
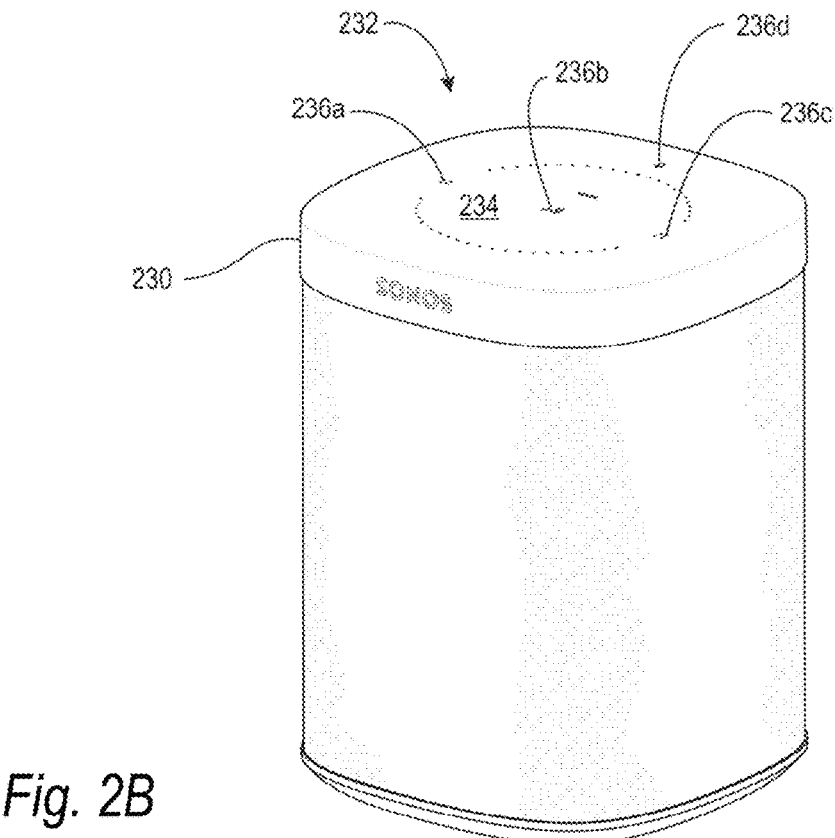
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the MPS 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

Figure 2C:
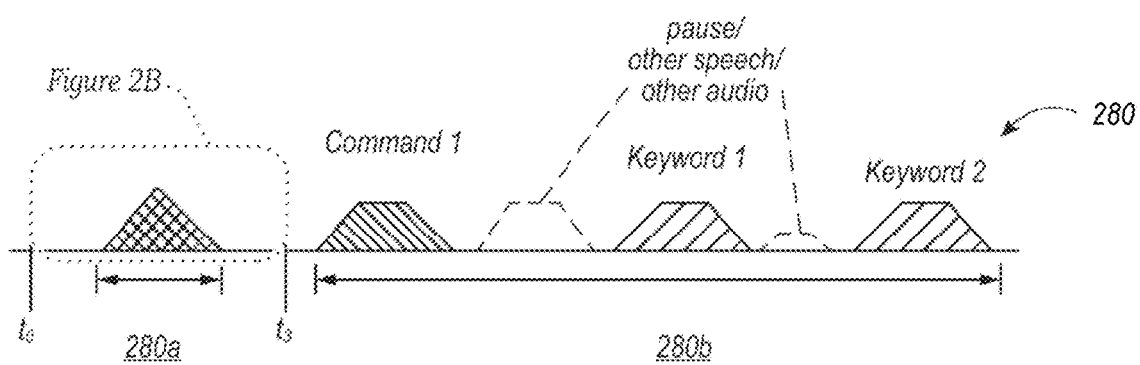
FIG. 2C is a diagram of an example voice input.

FIG. 2C is a diagram of an example voice input 280 that may be processed by an NMD or an NMD-equipped playback device. The voice input 280 may include a keyword portion 280a and an utterance portion 280b. The keyword portion 280a may include a wake word. The utterance portion 280b corresponds to detected sound that potentially comprises a user request following the keyword portion 280a. An utterance portion 280b can be processed to identify the presence of any words in detected-sound data by the NMD in response to the event caused by the keyword portion 280a. In various implementations, an underlying intent can be determined based on the words in the utterance portion 280b. For example, the words may correspond to one or more commands. A keyword in the voice utterance portion 280b may be, for example, a word identifying a particular device or group in the MPS 100. For instance, in the illustrated example, the keywords in the voice utterance portion 280b may be one or more words identifying one or more zones in which the music is to be played, such as the Living Room and the Dining Room (FIG. 1A). In some cases, the utterance portion 280b may include additional information, such as detected pauses (e.g., periods of non-speech) between words spoken by a user, as shown in FIG. 2C. The pauses may demarcate the locations of separate commands, keywords, or other information spoke by the user within the utterance portion 280b.

Based on certain command criteria, the NMD and/or a remote VAS may take actions as a result of identifying one or more commands in the voice input. Command criteria may be based on the inclusion of certain keywords within the voice input, among other possibilities. Additionally, or alternatively, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

In some implementations, the MPS 100 is configured to temporarily reduce the volume of audio content that it is playing upon detecting a certain keyword, such as a wake word, in the keyword portion 280a. The MPS 100 may restore the volume after processing the voice input 280. Such a process can be referred to as ducking, examples of which are disclosed in U.S. patent application Ser. No. 15/438,749, incorporated by reference herein in its entirety.

Figure 2D:
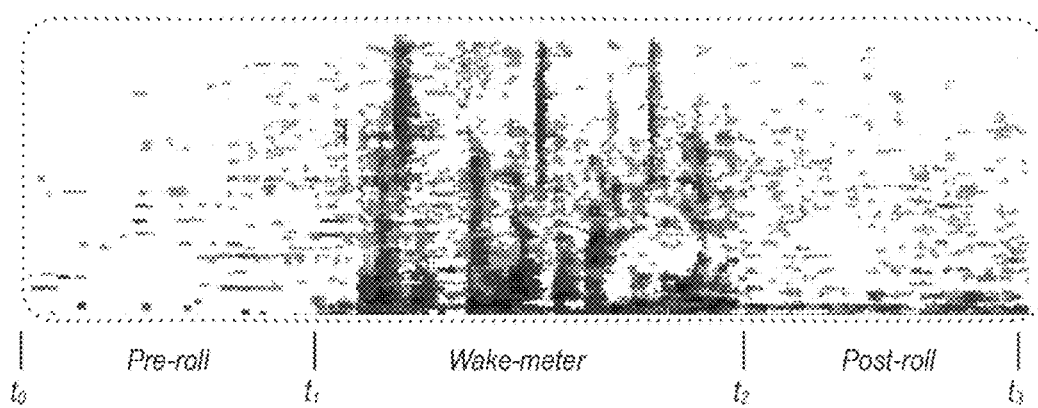
FIG. 2D is a graph depicting an example sound specimen in accordance with aspects of the disclosure.

FIG. 2D shows an example sound specimen. In this example, the sound specimen corresponds to the sound-data stream (e.g., one or more audio frames) associated with a spotted keyword, such as a keyword that is a predetermined wake word, in the keyword portion 280a of FIG. 2A. As illustrated, the example sound specimen comprises sound detected in an NMD's environment (i) immediately before a wake or command word was spoken, which may be referred to as a pre-roll portion (between times $t_0$ and $t_1$), (ii) while a wake or command word was spoken, which may be referred to as a wake-meter portion (between times $t_1$ and $t_2$), and/or (iii) after the wake or command word was spoken, which may be referred to as a post-roll portion (between times $t_2$ and $t_3$). Other sound specimens are also possible. In various implementations, aspects of the sound specimen can be evaluated according to an acoustic model which aims to map mels/spectral features to phonemes in a given language model for further processing. For example, automatic speech recognition may include such mapping for keyword detection. Speech recognition for keyword detection may be tuned to accommodate a wide range of keywords (e.g., 5, 10, 100, 1,000, 10,000 keywords).

b. Example Playback Device Configurations

Figure 3B:
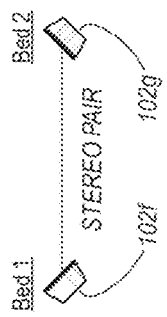
FIGS. 3A, 3B, 3C, 3D and 3E are diagrams showing example playback device configurations in accordance with aspects of the disclosure.
Figure 3C:
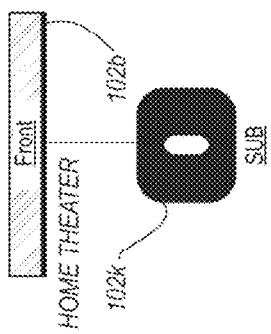
Figure 3D:
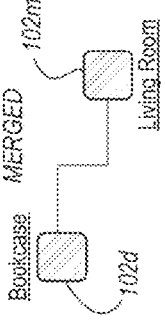
Figure 3E:
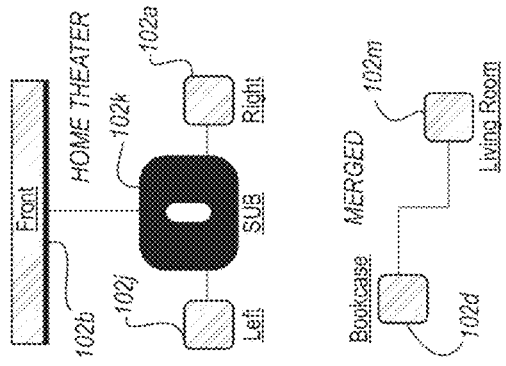
Figure 3A:
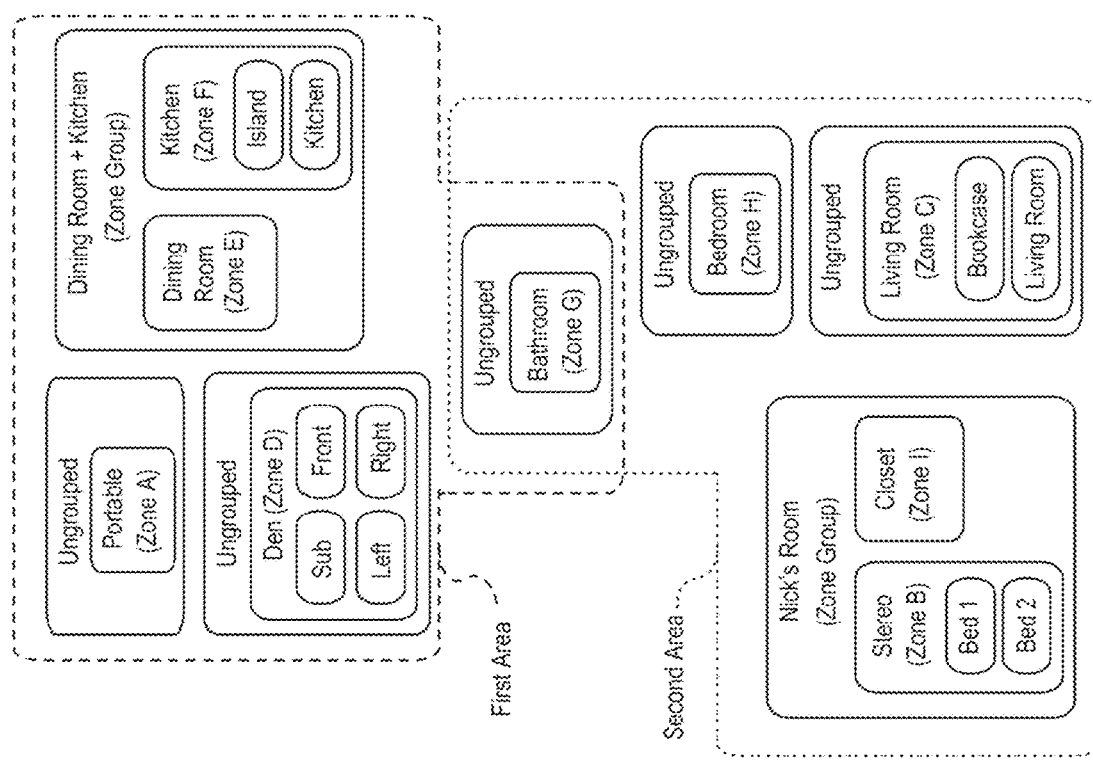

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102f in the master bedroom 101h (FIG. 1A) and the Bed 2 device may be the playback device 102g also in the master bedroom 101h (FIG. 1A).

As noted above, playback devices that are bonded may have different playback responsibilities, such as playback responsibilities for certain audio channels. For example, as shown in FIG. 3B, the Bed 1 and Bed 2 devices 102f and 102g may be bonded so as to produce or enhance a stereo effect of audio content. In this example, the Bed 1 playback device 102f may be configured to play a left channel audio component, while the Bed 2 playback device 102g may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102b named "Front" may be bonded with the playback device 102k named "SUB." The Front device 102b may render a range of mid to high frequencies, and the SUB device 102k may render low frequencies as, for example, a subwoofer. When unbonded, the Front device 102b may be configured to render a full range of frequencies. As another example, FIG. 3D shows the Front and SUB devices 102b and 102k further bonded with Right and Left playback devices 102a and 102j, respectively. In some implementations, the Right and Left devices 102a and 102j may form surround or "satellite" channels of a home theater system. The bonded playback devices 102a, 102b, 102j, and 102k may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102d and 102m in the Living Room merged, which would result in these devices being represented by the single UI entity of Zone C. In one embodiment, the playback devices 102d and 102m may playback audio in synchrony, during which each outputs the full range of audio content that each respective playback device 102d and 102m is capable of rendering.

In some embodiments, a stand-alone NMD may be in a zone by itself. For example, the NMD 103h from FIG. 1A is named "Closet" and forms Zone I in FIG. 3A. An NMD may also be bonded or merged with another device so as to form a zone. For example, the NMD device 103f named "Island" may be bonded with the playback device 102i Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A.

The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the MPS 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs. During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone.

For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

FIG. 4 is a functional block diagram illustrating certain aspects of a selected one of the controller devices 104 of the MPS 100 of FIG. 1A. Such controller devices may also be referred to herein as a "control device" or "controller." The controller device shown in FIG. 4 may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4, the controller device 104 also includes a user interface 440 that is generally configured to facilitate user access and control of the MPS 100. The user interface 440 may include a touch-screen display or other physical interface configured to provide various graphical controller interfaces, such as the controller interfaces 540a and 540b shown in FIGS. 5A and 5B. Referring to FIGS. 5A and 5B together, the controller interfaces 540a and 540b includes a playback control region 542, a playback zone region 543, a playback status region 544, a playback queue region 546, and a sources region 548. The user interface as shown is just one example of an interface that may be provided on a network device, such as the controller device shown in FIG. 4, and accessed by users to control a media playback system, such as the MPS 100. Other user interfaces of varying formats, styles, and interactive sequences may alternatively be implemented on one or more network devices to provide comparable control access to a media playback system.

The playback control region 542 (FIG. 5A) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 542 may also include selectable icons that, when selected, modify equalization settings and/or playback volume, among other possibilities.

The playback zone region 543 (FIG. 5B) may include representations of playback zones within the MPS 100. The playback zones regions 543 may also include a representation of zone groups, such as the Dining Room+Kitchen zone group, as shown.

In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 543 (FIG. 5B) may be dynamically updated as playback zone or zone group configurations are modified.

The playback status region 544 (FIG. 5A) may include graphical representations of audio content that is presently being played, previously played, or scheduled to play next in the selected playback zone or zone group. The selected playback zone or zone group may be visually distinguished on a controller interface, such as within the playback zone region 543 and/or the playback status region 544. The graphical representations may include track title, artist name, album name, album year, track length, and/or other relevant information that may be useful for the user to know when controlling the MPS 100 via a controller interface.

The playback queue region 546 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 5A and 5B, the graphical representations of audio content in the playback queue region 646 (FIG. 5A) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 548 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102a and 102b in the Living Room shown in FIG. 1A, and a second VAS to the NMD 103f in the Kitchen. Other examples are possible.

d. Example Audio Content Sources

The audio sources in the sources region 548 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

Figure 6:
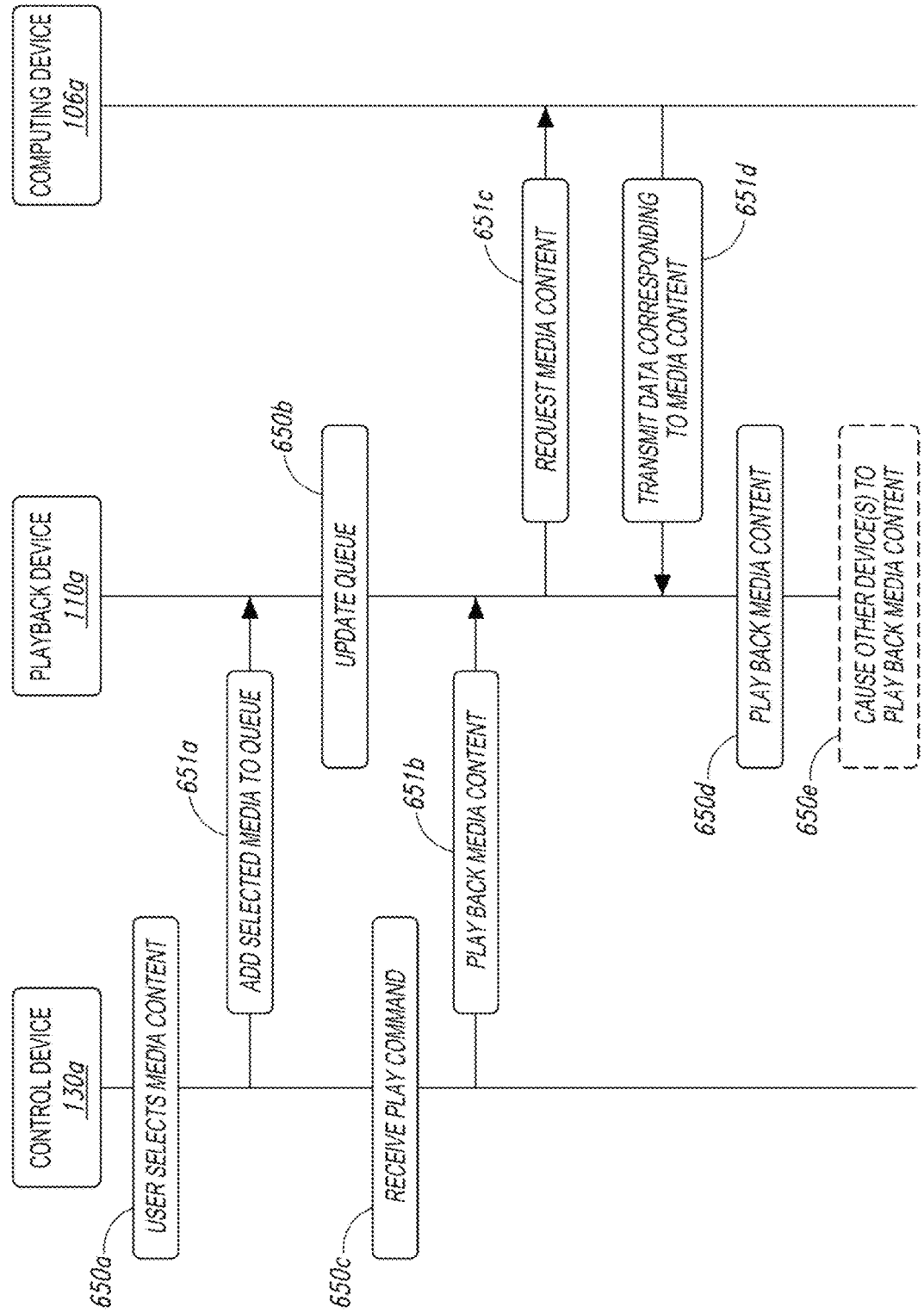
FIG. 6 is a message flow diagram of a media playback system.

FIG. 6 is a message flow diagram illustrating data exchanges between devices of the MPS 100. At step 650a, the MPS 100 receives an indication of selected media content (e.g., one or more songs, albums, playlists, podcasts, videos, stations) via the control device 104. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 104 transmits a message 651a to the playback device 102 (FIGS. 1A-1C) to add the selected media content to a playback queue on the playback device 102.

At step 650b, the playback device 102 receives the message 651a and adds the selected media content to the playback queue for play back.

At step 650c, the control device 104 receives input corresponding to a command to play back the selected media content. In response to receiving the input corresponding to the command to play back the selected media content, the control device 104 transmits a message 651b to the playback device 102 causing the playback device 102 to play back the selected media content. In response to receiving the message 651b, the playback device 102 transmits a message 651c to the computing device 106 requesting the selected media content. The computing device 106, in response to receiving the message 651c, transmits a message 651d comprising data (e.g., audio data, video data, a URL, a URI) corresponding to the requested media content.

At step 650d, the playback device 102 receives the message 651d with the data corresponding to the requested media content and plays back the associated media content.

At step 650e, the playback device 102 optionally causes one or more other devices to play back the selected media content. In one example, the playback device 102 is one of a bonded zone of two or more players (FIG. 1M). The playback device 102 can receive the selected media content and transmit all or a portion of the media content to other devices in the bonded zone. In another example, the playback device 102 is a coordinator of a group and is configured to transmit and receive timing information from one or more other devices in the group. The other one or more devices in the group can receive the selected media content from the computing device 106, and begin playback of the selected media content in response to a message from the playback device 102 such that all of the devices in the group play back the selected media content in synchrony.

III. Example Systems and Methods for Processing Sound

Figure 7:
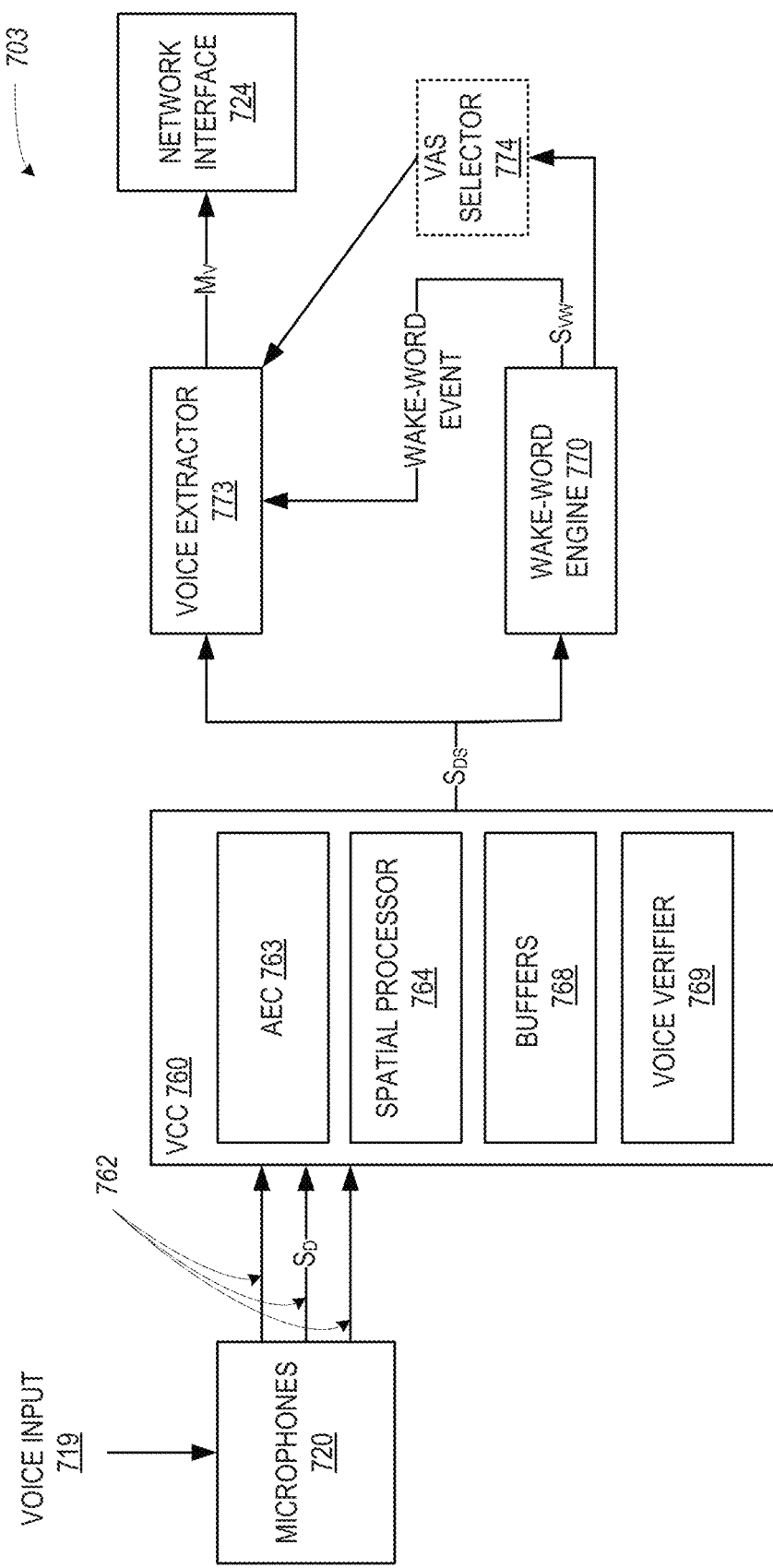
FIG. 7 is a functional block diagram of certain components of an example network microphone device in accordance with aspects of the disclosure.

FIG. 7 is a functional block diagram showing aspects of an NMD 703 configured in accordance with embodiments of the disclosure. The NMD 703 may be generally similar to the NMD 103 and include similar components. As described in more detail below, the NMD 703 is configured to obtain verification information related to a voice input and use that verification information to determine whether the speaker of the voice input is a verified user. If the verification information indicates that the speaker is not a verified user, the MPS 100 and/or NMD 703 may functionally disable any media playback commands contained within the voice input. Regardless of the result of the verification assessment, if the voice input includes a wake word, the NMD 703 still sends the voice input to the VAS and receives the related instructions back from the VAS. Accordingly, the NMD 703 may control which voice commands are executed by the NMD 703 without relying on any analysis by the VAS.

Referring to FIG. 7, the NMD 703 includes voice capture components ("VCC") 760, a voice extractor 773, and a keyword engine, such as a wake-word engine 770, as shown in the illustrated example of FIG. 7. The wake-word engine 770 and the voice extractor 773 are operably coupled to the VCC 760. In various embodiments, the wake-word engine 770 may be associated with a particular VAS and may invoke that VAS when one or more VAS wake words are detected in a voice input. The NMD 703 further includes microphones 720 and the at least one network interface 724 as described above and may also include other components, such as audio amplifiers, a user interface, etc., which are not shown in FIG. 7 for purposes of clarity. The microphones 720 of the NMD 703 are configured to provide detected sound, SD, from the environment of the NMD 703 to the VCC 760. The detected sound SD may take the form of one or more analog or digital signals. In example implementations, the detected sound SD may be composed of a plurality of signals associated with respective channels that are fed to the VCC 760.

As further shown in FIG. 7, the VCC 760 includes an AEC 763, a spatial processor 764, one or more buffers 768, and a speech processor 769. In operation, the AEC 763 receives the detected sound SD and filters or otherwise processes the sound to suppress echoes and/or to otherwise improve the quality of the detected sound SD. That processed sound may then be passed to the spatial processor 764.

The spatial processor 764 is typically configured to analyze the detected sound SD and identify certain characteristics, such as a sound's amplitude (e.g., decibel level), frequency spectrum, directionality, etc. In one respect, the spatial processor 764 may help filter or suppress ambient noise in the detected sound SD from potential user speech based on similarities and differences in the constituent channels of the detected sound SD, as discussed above. As one possibility, the spatial processor 764 may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor 764 may be configured to determine a speech presence probability, examples of such functionality are disclosed in U.S. patent application Ser. No. 15/984,073, filed May 18, 2018, titled "Linear Filtering for Noise-Suppressed Speech Detection," which is incorporated herein by reference in its entirety.

In operation, the one or more buffers 768—one or both of which may be part of or separate from the memory 213 (FIG. 2A)—capture data corresponding to the detected sound SD. More specifically, the one or more buffers 768 capture detected-sound data that was processed by the upstream AEC 764 and spatial processor 764. The network interface 724 may then provide this information to a remote server that may be associated with the MPS 100.

The voice verifier 769 is configured to process the voice input 719 to generate verification information, such as biometric information. The verification information may be, for example, the speaker's voiceprint (i.e., a set of features unique to the speaker derived from spectra of captured acoustic data). The NMD 703 may have the enrolled user's voiceprint stored in its memory and the voiceprint generated by the voice verifier 769 may be compared to the voiceprint of verified user(s). As described in greater detail below, should the generated voiceprint indicate an unverified speaker, the NMD 703 may functionally disable the speaker's request. In some embodiments, some of the voice verification may also occur at a remote computing device. In particular embodiments, the NMD 703 does not include a voice verifier 769 and all voice verification processing occurs at a remote computing device.

In any event, the detected-sound data forms a digital representation (i.e., sound-data stream), $S_{DS}$, of the sound detected by the microphones 720. In practice, the sound-data stream $S_{DS}$ may take a variety of forms. As one possibility, the sound-data stream $S_{DS}$ may be composed of frames, each of which may include one or more sound samples. The frames may be streamed (i.e., read out) from the one or more buffers 768 for further processing by downstream components, such as the noise classifier 766, the wake-word engine 770, the speech processor 769, or the voice extractor 773 of the NMD 703.

In some implementations, the one or more buffers 769 capture detected-sound data utilizing a sliding window approach in which a given amount (i.e., a given window) of the most recently captured detected-sound data is retained in the one or more buffers 768 while older detected sound data is overwritten when it falls outside of the window. For example, each of the one or more buffers 768 may temporarily retain 20 frames of a sound specimen at given time, discard the oldest frame after an expiration time, and then capture a new frame, which is added to the 19 prior frames of the sound specimen.

In practice, when the sound-data stream $S_{DS}$ is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, SNR, microphone channel identification, and/or other information of the given sound specimen, among other examples. Thus, in some embodiments, a frame may include a portion of sound (e.g., one or more samples of a given sound specimen) and metadata regarding the portion of sound. In other embodiments, a frame may only include a portion of sound (e.g., one or more samples of a given sound specimen) or metadata regarding a portion of sound.

The one or more buffers 768 can store information (e.g., metadata or the like) regarding the detected sound SD that was processed upstream by at least one of the AEC 763, the spatial processor 764, or another one of the buffers. Examples of such sound metadata include speech spectral data, such as one or more voiceprints. In at least some embodiments, the sound metadata may be transmitted separately from the sound-data stream $S_{DS}$ to the network interface 724. For example, the sound metadata may be transmitted from the one or more buffers 768 to one or more remote computing devices separate from the VAS which receives the sound-data stream $S_{DS}$ (such as a voice verification service).

In one aspect, the information stored in the one or more buffers 768 does not reveal the content of any speech but instead is indicative of certain unique features of the detected sound itself. In a related aspect, the information may be communicated between computing devices, such as the various computing devices of the MPS 100, without necessarily implicating privacy concerns. In practice, the MPS 100 can use this to verify voice inputs, as described in greater detail below.

In any case, downstream components of the NMD 703 may process the sound-data stream $S_{DS}$. For instance, the wake-word engine 770 is configured to apply one or more identification algorithms to the sound-data stream $S_{DS}$ (e.g., streamed sound frames) to spot potential wake words in the detected-sound SD via, e.g., automatic speech recognition and related voice processing techniques.

Example wake word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wake-words.

For instance, when the wake-word engine 770 detects a potential wake word, the wake-word engine 770 provides an indication of a "wake-word event" (also referred to as a "wake-word trigger"). In the illustrated example of FIG. 7, the wake-word engine 770 outputs a signal, $S_{VW}$, that indicates the occurrence of a wake-word event to the voice extractor 773.

In multi-VAS implementations, the NMD 703 may include a VAS selector 774 (shown in dashed lines) that is generally configured to direct extraction by the voice extractor 773 and transmission of the sound-data stream $S_{DS}$ to the appropriate VAS when a given wake-word is identified by a particular wake-word engine (and a corresponding wake-word trigger), such as the wake-word engine 770. In such implementations, the NMD 703 may include multiple, different wake word engines and/or voice extractors. Each wake-word engine may be supported by a respective VAS.

Similar to the discussion above, each wake-word engine 770 may be configured to receive as input the sound-data stream $S_{DS}$ from the one or more buffers 768 and apply identification algorithms to cause a wake-word trigger for the appropriate VAS. Thus, as one example, the wake-word engine 770 may be configured to identify the wake word "Alexa" and cause the NMD 703 to invoke the AMAZON VAS when "Alexa" is spotted. As another example, an additional wake-word engine (not shown) may be configured to identify the wake word "Ok, Google" and cause the NMD 520 to invoke the GOOGLE VAS when "Ok, Google" is spotted. In single-VAS implementations, the VAS selector 774 may be omitted.

In response to the wake-word event (e.g., in response to the signal $S_{VW}$ indicating the wake-word event), the voice extractor 773 is configured to receive and format (e.g., packetize) the sound-data stream $S_{DS}$. For instance, the voice extractor 773 packetizes the frames of the sound-data stream $S_{DS}$ into messages. The voice extractor 773 transmits or streams these messages, $M_V$, that may contain voice input in real time or near real time to a remote VAS via the network interface 724.

The VAS is configured to process the sound-data stream $S_{DS}$ contained in the messages $M_V$ sent from the NMD 703. More specifically, the NMD 703 is configured to identify a voice input 719 based on the sound-data stream $S_{DS}$. As described in connection with FIG. 2C, the voice input may include a keyword portion and an utterance portion. The keyword portion corresponds to detected sound that caused a keyword event (e.g., a wake-word event), or leads to a such an event when one or more certain conditions, such as certain playback conditions, are met. For instance, when the voice input 719 includes a VAS wake word (e.g., "Alexa," "Okay Google," etc.), the keyword portion corresponds to detected sound that caused the wake-word engine 770 to output the wake-word event signal $S_{VW}$ to the voice extractor 773. The utterance portion in this case corresponds to detected sound that potentially comprises a user request following the keyword portion. Although the keyword portion often times comes before the utterance portion within a given voice input, in some instances the keyword portion may additionally or alternatively come after the utterance portion and/or may be embedded between different portions of the utterance portion.

When a VAS wake-word event occurs, the VAS may first process the keyword portion within the sound data stream $S_{DS}$ to verify the presence of a VAS wake word. In some instances, the VAS may determine that the keyword portion comprises a false wake word (e.g., the word "Election" when the word "Alexa" is the target VAS wake word). In such an occurrence, the VAS may send a response to the NMD 703 with an instruction for the NMD 703 to cease extraction of sound data, which causes the voice extractor 773 to cease further streaming of the detected-sound data to the VAS. The wake-word engine 770 may resume or continue monitoring sound specimens until it spots another potential VAS wake word, leading to another VAS wake-word event. In some implementations, the VAS does not process or receive the keyword portion but instead processes only the utterance portion.

In any case, the VAS processes the utterance portion to identify the presence of any words in the detected-sound data and to determine an underlying intent from these words.

The words may correspond to one or more commands, as well as certain keywords. The keyword may be, for example, a word in the voice input identifying a particular device or group in the MPS 100. For instance, in the illustrated example, the keyword may be one or more words identifying one or more zones in which the music is to be played, such as the Living Room and the Dining Room (FIG. 1A).

To determine the intent of the words, the VAS is typically in communication with one or more databases associated with the VAS (not shown) and/or one or more databases (not shown) of the MPS 100. Such databases may store various user data, analytics, catalogs, and other information for natural language processing and/or other processing. In some implementations, such databases may be updated for adaptive learning and feedback for a neural network based on voice-input processing. In some cases, the utterance portion may include additional information, such as detected pauses (e.g., periods of non-speech) between words spoken by a user, as shown in FIG. 2C. The pauses may demarcate the locations of separate commands, keywords, or other information spoke by the user within the utterance portion.

After processing the voice input, the VAS may send a response to the MPS 100 with an instruction to perform one or more actions based on an intent it determined from the voice input. For example, based on the voice input, the VAS may direct the MPS 100 to initiate playback on one or more of the playback devices 102 (such as NMD 703), control one or more of these playback devices 102 (e.g., raise/lower volume, group/ungroup devices, etc.), or turn on/off certain smart devices, among other actions. After receiving the response from the VAS, the wake-word engine 770 of the NMD 703 may resume or continue to monitor the sound-data stream $S_{DS}$ until it spots another potential wake-word, as discussed above. As detailed below, in some instances the NMD 703 may choose to effectively ignore instructions received from the VAS if it is determined that the instructions are in furtherance of a command spoken by an unverified user.

In general, the one or more identification algorithms that a particular keyword engine, such as the wake-word engine 770, applies are configured to analyze certain characteristics of the detected sound stream $S_{DS}$ and compare those characteristics to corresponding characteristics of the particular wake-word engine's one or more particular wake words. For example, the wake-word engine 770 may apply one or more identification algorithms to spot spectral characteristics in the detected sound stream $S_{DS}$ that match the spectral characteristics of the engine's one or more wake words, and thereby determine that the detected sound SD comprises a voice input including a particular wake word.

In some implementations, the one or more identification algorithms may be third-party identification algorithms (i.e., developed by a company other than the company that provides the NMD 703). For instance, operators of a voice service (e.g., AMAZON) may make their respective algorithms (e.g., identification algorithms corresponding to AMAZON's ALEXA) available for use in third-party devices (e.g., the NMDs 103), which are then trained to identify one or more wake words for the particular voice assistant service. Additionally, or alternatively, the one or more identification algorithms may be first-party identification algorithms that are developed and trained to identify certain wake words that are not necessarily particular to a given voice service. Other possibilities also exist.

In some embodiments, the NMD 703 may optionally include additional or alternate keyword engines (not shown) in parallel with the wake-word engine 770. In some implementations, a keyword functions as both an activation word and a command itself (i.e., rather than being utilized as a nonce word alone). For instance, example command keywords may correspond to playback commands (e.g., "play," "pause," "skip," etc.) as well as control commands ("turn on"), among other examples. Under appropriate conditions, based on detecting one of these command keywords, the NMD 703 perform a corresponding command. In some implementations a keyword engine may comprise or include functionality similar to keyword engines disclosed in in U.S. patent application Ser. No. 16/439,009, filed Jun. 12, 2019, titled "Network Microphone Device with Command Keyword Conditioning"; U.S. patent application Ser. No. 16/439,032, filed Jun. 12, 2019, titled "Network Microphone Device with Command Word Eventing"; and U.S. patent application Ser. No. 16/439,046, filed Jun. 12, 2019, titled "Conditional Wake Word Eventing Based on Environment," which are incorporated herein by reference in their entireties.

In some embodiments, one or more of the components described above can operate in conjunction with the microphones 720 to detect and store a user's voice profile, which may be associated with a user account of the MPS 100. In some embodiments, voice profiles may be stored as and/or compared to variables stored in a set of command information or data table. The voice profile may include aspects of the tone or frequency of a user's voice and/or other unique aspects of the user, such as those described in previously referenced U.S. patent application Ser. No. 15/438,749.

In some embodiments, one or more of the components described above can operate in conjunction with the microphones 720 to determine the location of a user in the home environment and/or relative to a location of one or more of the NMDs 103. Techniques for determining the location or proximity of a user may include one or more techniques disclosed in previously referenced U.S. patent application Ser. No. 15/438,749, U.S. Pat. No. 9,084,058 filed Dec. 29, 2011, and titled "Sound Field Calibration Using Listener Localization," and U.S. Pat. No. 8,965,033 filed Aug. 31, 2012, and titled "Acoustic Optimization." Each of these applications is herein incorporated by reference in its entirety.

IV. Example Systems and Methods for Verifying Media Playback Commands

Figure 8:
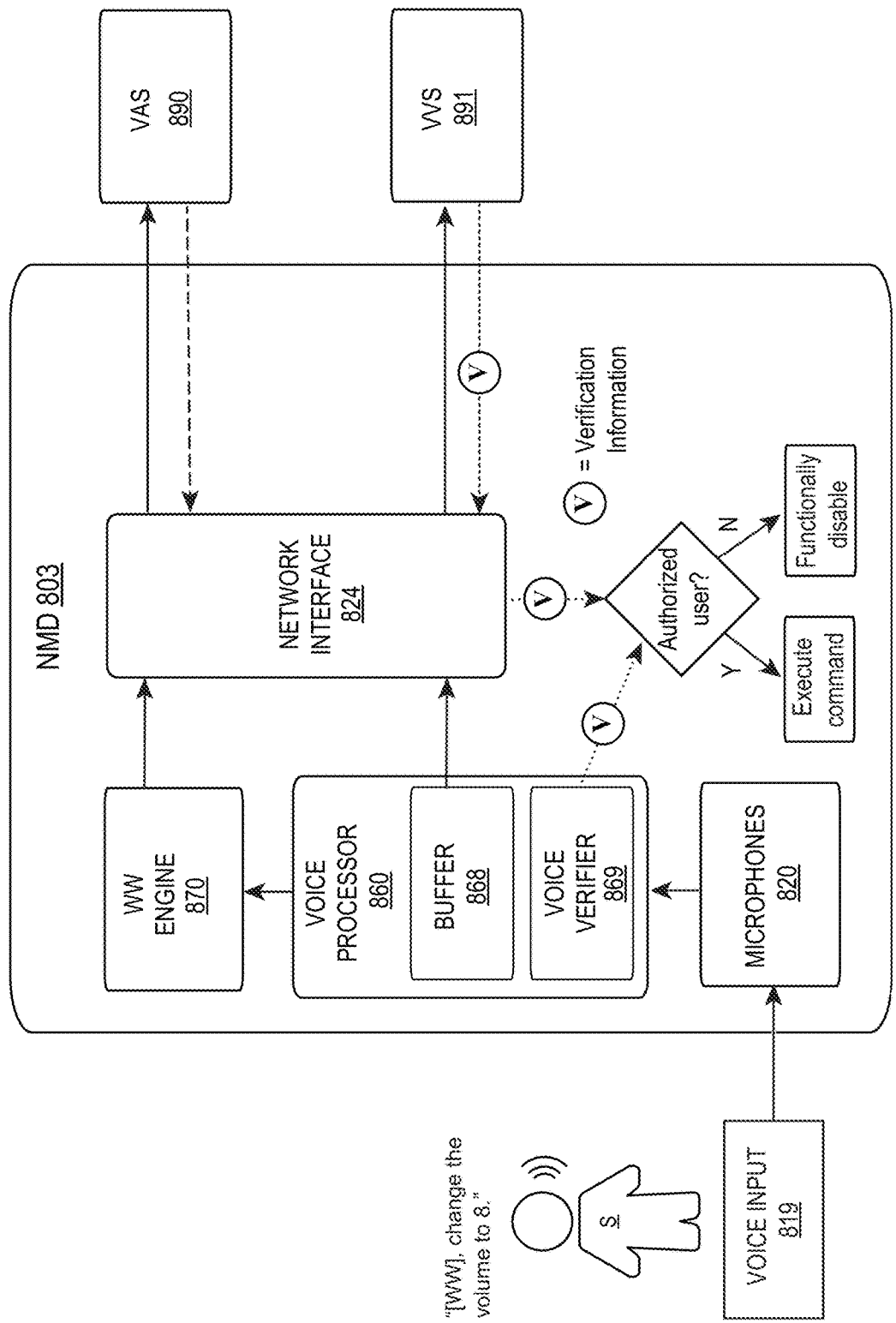
FIG. 8 is a schematic diagram showing an example network microphone device in accordance with aspects of the disclosure.

FIG. 8 depicts a network microphone device 803 ("NMD 803") configured to manage implementation of voice commands for media playback by requiring the speaker of the voice command be verified before implementing the command. Such a feature may be desirable, for example, for a parent seeking to limit which songs may be requested by a child in the household, or for a host seeking to limit their guests control over the volume of the music playing at a get together. As described in greater detail below, the NMD 803 may be configured to obtain verification information derived from a voice input containing a command and functionally disable or alter one or more aspects of the command if the verification information characterizing the speaker of the command does not meet the required verification profile. Although the methods described below are described with reference to a single NMD, the methods of the present technology include managing commands received at any number of NMDs within the MPS 100.

The NMD 803 may be part of a media playback system (such as MPS 100). As shown in FIG. 8, the NMD 803 may include components that are generally similar to components of the playback and network microphone devices described above. For example, the NMD 803 may include playback components (not shown) such as an audio interface, an audio-output processor, speakers, etc. The NMD 803 may include a plurality of on-board microphones 820 (e.g., far field microphones) configured to detect sound, including a voice input. The voice input captured by the microphones 820 may be processed by the voice processor 860 and fed to the wake-word engine 870 and the network interface 824. In the example depicted in FIG. 8, the voice processor 860 transmits the processed detected sound from the microphones 820 to the wake word engine 870.

The NMD 803 further includes voice processing components that may be similar to some or all of the voice processing components of the NMD 703 described above with reference to FIG. 7. For example, the NMD 803 includes a voice processor 860 and a wake word engine 870 associated with a VAS 890. The NMD 803 further includes a network interface 824 configured to communicate with other NMDs of the MPS 100 over local and/or wide area networks. The network interface 824 may also be configured to communicate with one or more remote servers over local and/or wide area networks. For example, the network interface 824 may be configured to communicate with one or more remote computing devices associated with the VAS 890, as well as one or more remote computing devices associated with a voice verification service 891 ("VVS 891") and/or the MPS 100. In some embodiments, the one or more remote computing devices 891 may be configured to analyze the voice input and derive verification information that may be used by the NMD 803 and/or by the remote computing devices 891 associated with the VVS to determine whether the speaker of the voice input is verified to make a particular command in the captured voice input.

The voice processor 860 of the NMD 803 may include voice processing components, such as an AEC, a spatial processor, one or more buffers 868, and an optional voice verifier 869. The components of the voice processor 860 are configured to process and feed the captured voice input to the wake-word engine 870. The wake-word engine 870 may be configured to detect a wake word specific to the VAS 890. For example, the wake word engine 870 may be associated with AMAZON's ALEXA and be configured to run a corresponding wake word detection algorithm (e.g., configured to detect the wake word "Alexa" or other associated wake word).

One or more components of the voice processor 860 may also be configured to process the voice input to generate verification information characterizing the voice input. For example, in some embodiments, the voice verifier 869 may be configured to process the voice input and generate verification information unique to the speaker of the voice input, such as biometric information. As described above, verification information may comprise, for example, spectral features such as a voiceprint. Different speakers have different voiceprints, and by identifying the different voiceprints, different speakers can be classified as verified or unverified. In example implementations, the voice verifier 869 may analyze the sound metadata in the one or more buffers 868 or other memory to verify the speaker of the voice input. The NMD 803 may have the voiceprints of one or more verified users stored in its one or more buffers 868 or other memory and the voice verifier 869 may compare the voiceprint(s) of the captured voice input to the stored, verified voiceprint(s). As described in greater detail below, should the generated voiceprint indicate that the speaker is not verified, the NMD 803 may functionally disable or alter implementation of the speaker's command such that the command is effectively ignored.

As previously mentioned, in some embodiments at least some of the processing of the voice input for deriving verification information and/or verifying the speaker may be performed by the one or more remote computing devices associated with the VVS 891. The NMD 803, for example, may transmit the raw recording of the voice input and/or metadata associated with the voice input to a remote computing devices of the VVS 891 for biometric analysis and/or other verification methods. To preserve user privacy, in some embodiments the NMD 803 transmits only the metadata and does not transmit an audio recording of the voice input. The remote computing devices 891 receiving the metadata may further process the metadata (or other information transmitted by the NMD). For example, the NMD 803 may generate the verification information characterizing the voice input and transmit that data to the VVS 869 for verification. Regardless, the MPS 100 is configured such that the processing of the voice input for verification information and verification may be performed solely at the NMD 803 (e.g., via the voice verifier 869), solely at the VVS 891, or may be performed solely by the NMD 803 (without implementing or invoking any VVS), or may be performed in in part by both the NMD and the VVS 891.

Processing of the voice input to obtain verification information may occur completely independent of processing the voice input for the wake word (via the wake word engine 870) and/or regardless of whether a wake word is detected in the voice input. As such, the NMD 803 may verify or reject a playback command in a voice input without involvement from the VAS 890. The NMD 803, for example, may request and receive instructions from the VAS 890 related to the instructions for performing the command in the voice input before knowing if the voice input is verified or even after knowing the voice input is not verified. This way, a verified user of the NMD 803 can set controls for media playback by interacting only with the NMD 803 and/or MPS 100 and without the extra step of programming the VAS 890 or performing voice verification with the VAS 890. Likewise, in some embodiments, the methods and systems of the present technology provide the user with a greater degree of privacy by verifying the voice input locally and without the raw recording or the user's biometric data being sent to one or more remote computing devices associated with a VVS or a VAS.

Figure 9:
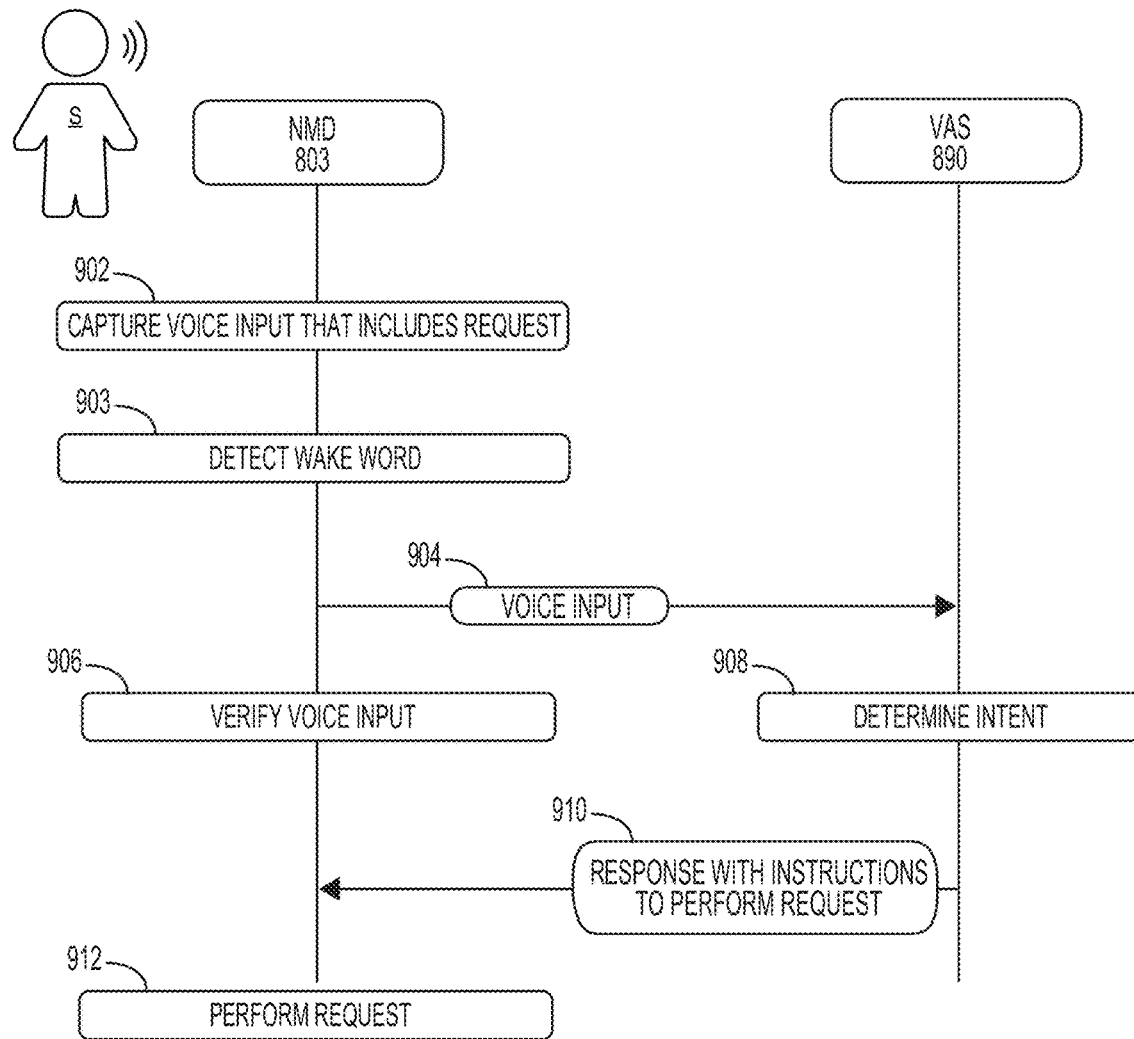

FIG. 9 depicts an example method for using the NMD 803 to verify a media playback command. In the scenario depicted in FIG. 9, a verified speaker S has requested that the NMD 803 (and/or another playback device of the MPS 100) play Fleetwood Mac's Rumours album. As shown at blocks 902 and 903, the NMD 803 captures this voice input and detects the wake word, respectively. The NMD 803 transmits the voice input 904 to the VAS 890, and at block 908 the VAS 890 processes the voice input to determine the speaker's intent. Based on the determined intent, the VAS 890 then sends a response 910 to the NMD 803. In those embodiments where the voice input includes a command (such as the present embodiment), the response 910 may include instructions for the NMD 803 to perform the command. Here, the response may include data (e.g., audio data, video data, a URL, a URI) corresponding to the requested media content (i.e., Fleetwood Mac's Rumours album).

At any time after the NMD 803 begins to capture the voice input (including before the speaker S has finished speaking the voice input), the NMD 803 may verify the voice input (block 906) to determine whether the speaker S is verified to make the given request. Information regarding the existence or status of the NMD's verification process is not communicated to the VAS 890. Thus, the VAS 890 processes the voice input to determine the intent 908 and sends a message to the NMD 803 with instructions for performing the speaker's request regardless of whether the speaker S has been verified by the NMD 803.

While the flow diagram of FIG. 9 depicts verification occurring after wake word detection and before the VAS 890 sends instructions to the NMD 803, as previously mentioned verification of the voice input may occur at other timepoints. For example, the NMD 803 may verify the voice input before, during, and/or after (a) the wake word is detected, (b) the voice input is transmitted to the VAS 890, (c) the VAS 890 processes the voice input to determine the intent, and/or (d) the VAS 890 sends a response to the NMD 803. Likewise, verification of the voice input may occur independent of the wake word detection such that the NMD 803 proceeds with verification regardless of whether the wake word is detected. In some embodiments, verification of the voice input only occurs if a wake word is detected.

In any case, verification of the voice input may include obtaining verification information, such as biometric information characterizing the speaker's voice profile, and comparing the derived verification information to stored information associated with one or more verified users. If the derived verification information does not indicate that the speaker S is a verified user, then the voice input will not be verified and the NMD 803 may proceed with functionally disabling or altering the speaker's command (as described in greater detail below with respect to FIGS. 10-12).

Processing of the voice input to obtain the verification information may occur locally at the NMD 803 (for example, via voice verifier 869) and/or at another playback device of the MPS 100. Additionally or alternatively, all or part of the verification information may be derived remotely at one or more remote computing devices associated with a VVS 891 and/or one or more remote computing devices associated with the MPS 100 and transmitted to the NMD 803. Moreover, analysis of the obtained verification information to verify the user may occur locally at the NMD 803 and/or at another playback device of the MPS 100, and/or may be determined remotely at one or more remote computing devices associated with a VVS 891 and/or with the MPS 100.

In the scenario of FIG. 9, the speaker S is a verified speaker, and thus the NMD 803 verifies the speaker's command to "play Fleetwood Mac's Rumours album." As a result, as shown at block 912, the NMD 803 executes the instructions received from VAS 890 and plays back the associated media content.

Figure 10:
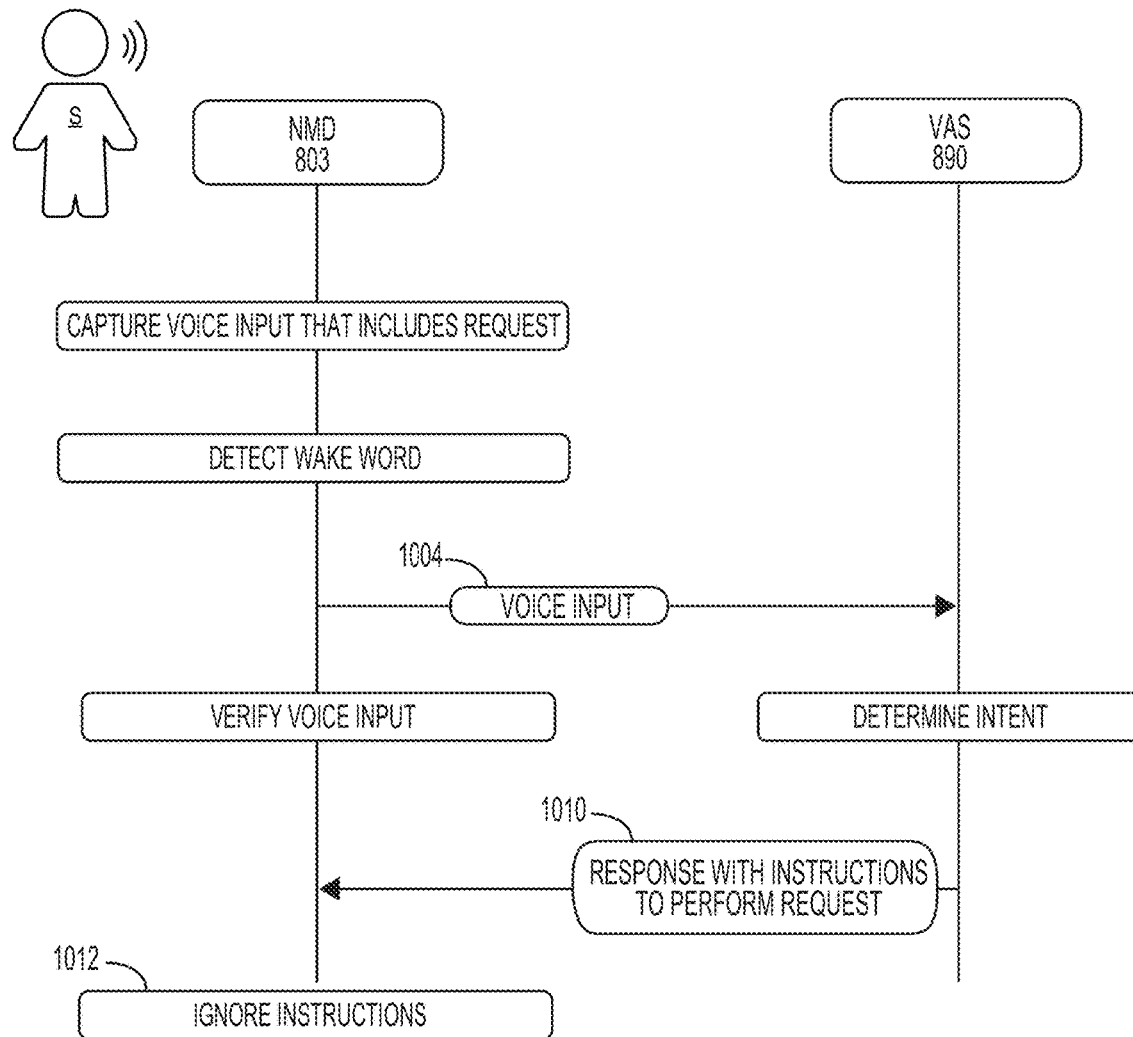
FIG. 10 is a message flow diagram of a media playback system in accordance with aspects of the disclosure.
Figure 11:
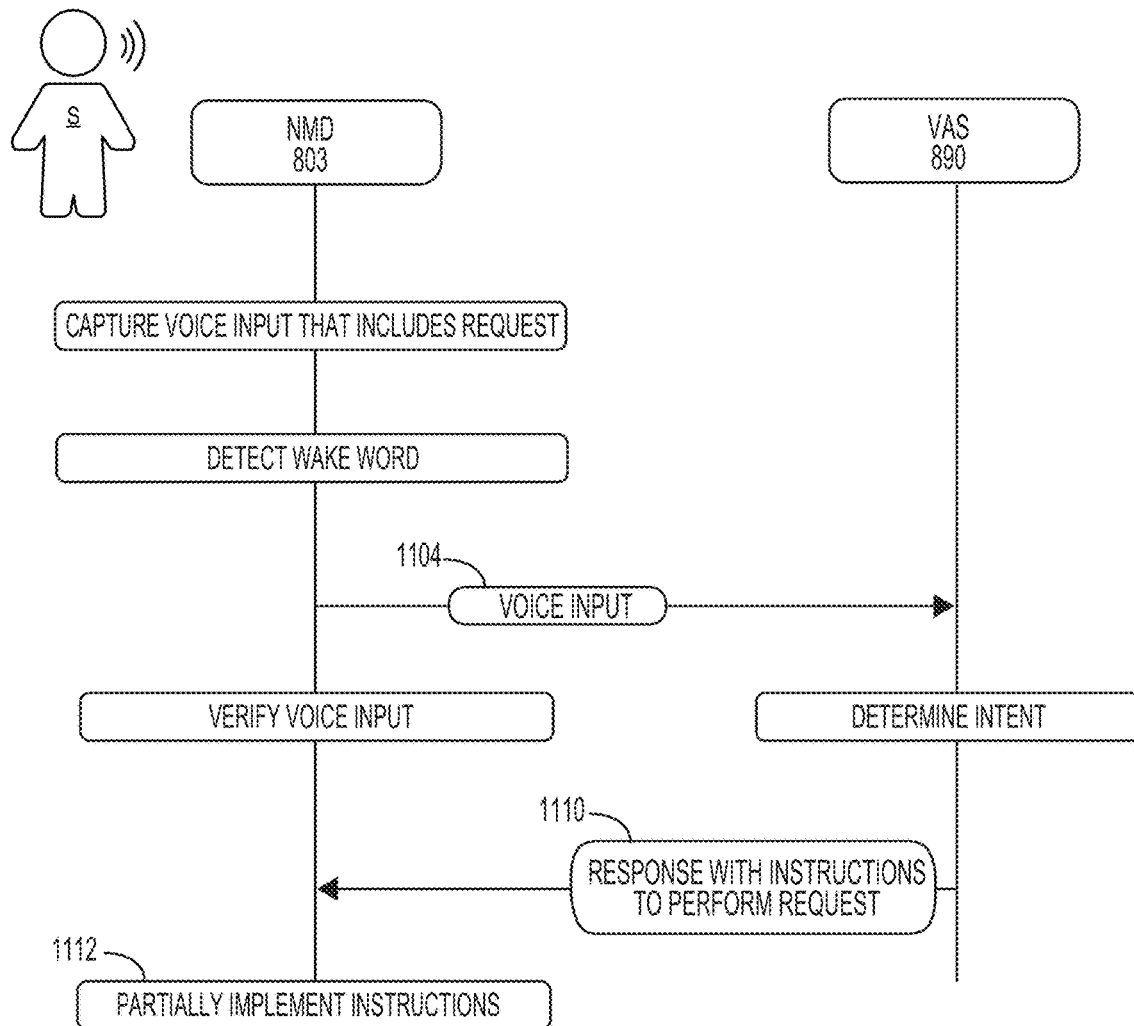
FIG. 11 is a message flow diagram of a media playback system in accordance with aspects of the disclosure.
Figure 12:
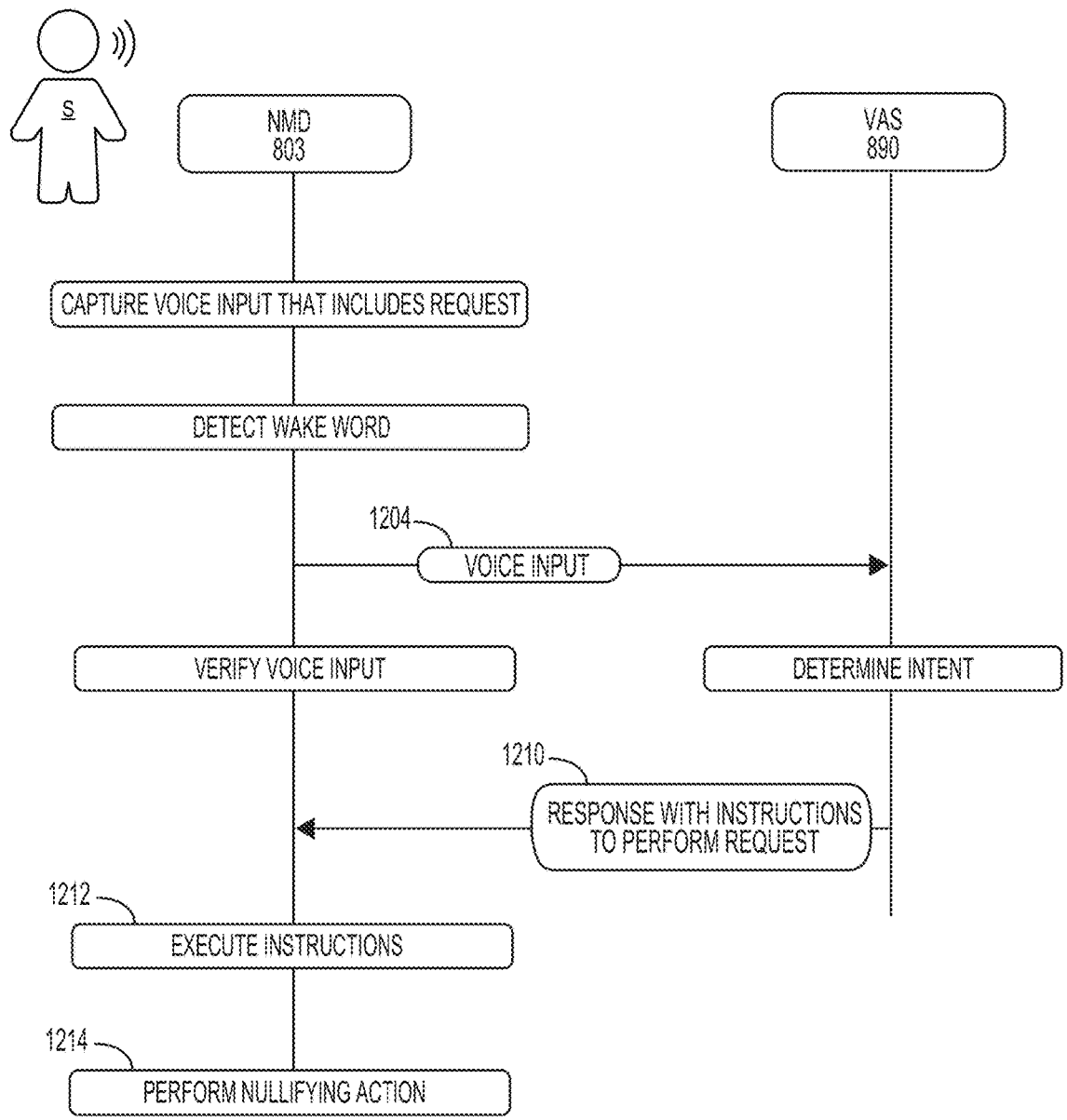
FIG. 12 is a message flow diagram of a media playback system in accordance with aspects of the disclosure.

As previously mentioned, in those situations where the speaker of the voice input is not verified, the NMD 803 may functionally disable or alter the playback command. FIGS. 10-12 illustrate various examples of how the NMD 803 may functionally disable or alter a playback command.

In response to a command from an unverified user, the NMD 803 may functionally disable the command by ignoring (i.e., not executing) the VAS's 890 instructions for implementing the command. For example, in the scenario depicted in FIG. 10, the NMD 803 is playing back music at a volume of 6 when an unverified speaker S commands: "[Wakeword], change the volume to level 8." The NMD 803 sends the voice input 1004 to the VAS 890 irrespective of the verification status of the voice input, and the VAS 890 processes the voice input and sends the NMD 803 a response 1010 with instructions for changing the volume from the current level of 6 to the higher, requested level of 8. Thus, even though the speaker S is not verified for making the command, the VAS 890 still sends—and the NMD 803 still receives—instructions for performing the command. Because the speaker S is not verified, however, the NMD 803 ignores the VAS's instructions (block 1012) and does not change the volume level of the music being played back. As such, the unverified speaker's request is effectively ignored. In some instances, the NMD 803 may functionally disable or nullify the command by not sending the unverified voice input to the VAS 890.

In some embodiments, in response to a command from an unverified speaker, the NMD 803 functionally disables the command by altering the instructions received from the VAS 890 before implementing them. For example, in the scenario depicted in FIG. 11, the NMD 803 is playing back music at a volume of 6 when a speaker S commands: "[Wakeword], change the volume to level 8." In this example, the speaker S is verified to change the volume, but not to a level greater than a level of 7. As in the previous examples, the NMD 803 sends the voice input 1104 to the VAS 890 irrespective of the verification status of the voice input, and the VAS 890 processes the voice input and sends the NMD 803 a response 1110 with instructions for changing the volume from the current level of 6 to the higher, requested level of 8. Because the speaker S is only verified for increasing the volume to a maximum level of 7, the NMD 803 effectively only partially executes the VAS's instructions and changes the volume to a level 7. In some embodiments, the NMD 803 may send a status update to the VAS 890 informing the VAS 890 that the volume has been changed to a level different than that provided in the VAS's instructions (here, the NMD would send a message to the VAS 890 that the volume has been changed to a level 7).

According to some aspects of the technology, the NMD 803 may execute the VAS's instructions but still functionally disable NMD 803 from performing the playback command by performing another action that negates or substantially negates the effects of implementing the VAS's instructions. For example, in the scenario depicted in FIG. 12, the NMD 803 is playing back music at a volume of 6 when a speaker S commands: "[Wakeword], change the volume to level 8." As in the previous examples, the NMD 803 sends the voice input 1204 to the VAS 890 irrespective of the verification status of the voice input, and the VAS 890 processes the voice input and sends the NMD 803 a response 1210 with instructions for changing the volume from the current level of 6 to the higher, requested level of 8. In this instance, however, rather than ignore or partially ignore the VAS's instructions, the NMD 803 executes the VAS's instructions 1210 (block 1212) but immediately (i.e., without being perceived by the user) performs a nullifying action (block 1214).

In some embodiments, the NMD 803 may achieve the nullifying action by manipulation of at least some of the same state variables adjusted in response to the VAS's instructions. For instance, in some cases the NMD 803 may execute the VAS's instructions to change one or more state variables but then immediately revert the one or more changed state variables back to their original values (i.e., at the time the request was made). By way of example, in the scenario where the NMD 803 is playing back music at a level 6 and an unverified user requests a volume increase to a level 8, the NMD 803 may change the volume to a level 8 (as instructed by the VAS 890), but then immediately revert to the original volume level of 6. In those cases where the speaker is partially verified to make the request, the NMD 803 may execute the VAS's instructions (thereby changing one or more state variables) but then immediately revert the one or more changed state variables back to a pre-approved value, which may or may not be the same as the value at the time the request was made. For instance, in the scenario where the NMD 803 is playing back music at a level 6 and a user only verified to change the volume to a maximum level of 7 requests a volume increase to a level 8, the NMD 803 may change the volume to a level 8 (as instructed by the VAS 890), but then immediately revert to the pre-approved level of 7. In either case, the NMD 803 may send a status update to the VAS 890 informing the VAS 890 that the volume has been changed to a level different than that provided in the VAS's instructions.

Additionally or alternatively, the NMD 803 may achieve the nullifying action by manipulation of state variables or parameters different than those affected by the VAS's instructions. For instance, in the scenario where an unverified user requests the NMD 803 play back particular media content, the NMD 803 may play back the requested media content but simultaneously change the volume to an inaudible level.

The MPS 100 and/or NMD 803 may be configured to apply verification-based restrictions to media playback according to any number of factors. The MPS 100 and/or NMD 803, for example, may apply the requirement that the user be verified only to a subset of commands. For instance, the requirement that the speaker of the voice input be verified may apply to changing the volume but not the song. The application of the verification requirement may also be limited to certain times of day and/or certain zones. For example, a parent may require that requests for music playback in the kitchen between midnight and 10 am require verification, while no verification is required for music playback in the kitchen between 10 am and midnight or in the basement at any time. Additionally or alternatively, for certain parameters, lack of verification may not be an absolute bar to the request, but rather may limit the bounds of the request. For example, an NMD 803 and/or MPS 100 may require verification for certain songs or other media and not others. For instance, the NMD 803 may require verification for playback of music with explicit lyrics but not for children's music.

According to some aspects of the technology, the MPS 100 and/or NMD 803 may be configured to automatically select a particular VAS based on the verification status of the user. For example, the MPS 100 and/or NMD 803 may be configured such that only a verified user or group of users has access to a particular VAS or VASes. In some embodiments, only a verified user may be able to use a first VAS (such as AMAZON'S ALEXA) and the NMD 803 may automatically select a second, different VAS (such as a VAS associated with the MPS 100) for unverified users, regardless of whether the unverified user's command includes a request for a particular VAS. In some cases, the NMD 803 may provide the unverified user with two or more VAS options that have been pre-approved for the unverified user's use.

In some embodiments, based on the verification status of the user, the MPS 100 and/or NMD 803 may be configured to automatically select whether the captured voice input is processed and/or verified locally at the NMD 803 or remotely at a VVS. For example, the MPS 100 and/or NMD 803 may be configured such that a voice input provided by a certain user or group of users is only processed at the NMD 803 and the raw recording of the voice input and/or metadata associated with the voice input remains local and is not transmitted to a remote computing device. Such a restriction may be beneficial, for example, for protecting the biometric information of children making requests. In some embodiments, the MPS 100 and/or NMD 803 may be configured such that the NMD 803 will not send any information or request to the VAS if a user speaks a wakeword for a VAS that the user is not verified to access.

Figure 13:
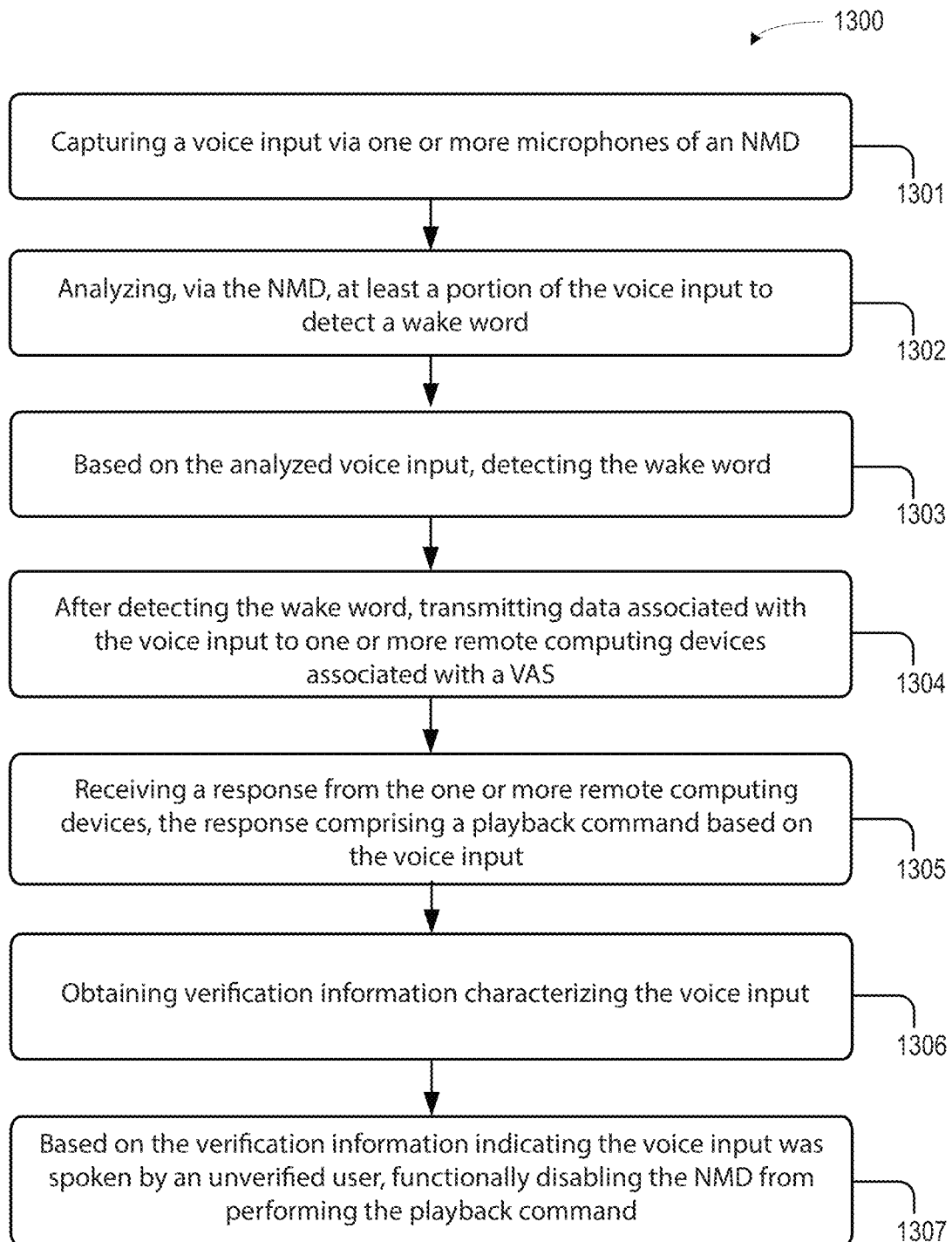
FIG. 13 is an example method for verifying voice commands for media playback in accordance with aspects of the disclosure.

FIG. 13 is an example method 1300 in accordance with embodiments of the present technology that can be implemented by a network microphone device, such as NMD 803, to verify a voice input and, if necessary, functionally disable or adjust implementation of the speaker's command by the NMD 803. With reference to FIGS. 8 and 13 together, the method 1300 begins at block 1301 with the NMD 803 capturing a voice input 819 from a speaker S via the microphones 820 of the NMD 803. In some embodiments, the NMD 803 may store the voice input in the one or more buffers 868 or other memory. The voice input may include a command related to media being played back or to be played back by the NMD 803, such as a playback command (e.g., "play," "pause," "skip," etc.) and/or a control command ("turn on"). In the scenario depicted in FIG. 8, the voice input 819 includes the command, "change the volume to 8."

Next, method 1300 advances to blocks 1302-1305 with analyzing, via the NMD 803, at least a portion of the voice input 819 to detect a wake word (block 1302), detecting the wake word based on the analyzed voice input (block 1303), transmitting data associated with the voice input to one or more remote computing devices associated with the VAS (such as VAS 890) (block 1304), and receiving a response from the one or more remote computing devices associated with the VAS, where the response comprises a playback command based on the voice input (block 1305). In some embodiments, the method 1300 does not include analyzing the voice input 819 to detect a wake word and/or detecting a wake word.

In block 1306, the method 1300 includes obtaining verification information characterizing the voice input. Obtaining the verification information may occur before, at the same time as, and/or after the wake word analysis. As discussed above, analysis of the voice input for verification information may occur independent of analysis of the voice input for wake word detection. In some embodiments, obtaining the verification information includes processing the voice input locally at the NMD 803 (for example, via voice verifier 869), at one or more remote computing devices associated with a VVS 891 and/or with the MPS 100, or both.

As shown at block 1307, method 1300 further includes, based on the verification information indicating that the voice input was spoken by an unverified user, functionally disabling the playback command via the NMD, as detailed elsewhere herein.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware.

Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A method comprising: capturing a voice input via one or more microphones of a network microphone device (NMD); analyzing, via the NMD, at least a portion of the voice input to detect a wake word; obtaining verification information characterizing the voice input; based on the analyzed voice input, detecting the wake word; after detecting the wake word, transmitting data associated with the voice input to one or more remote computing devices associated with a voice assistant service (VAS); receiving a response from the one or more remote computing devices, the response comprising a playback command based on the voice input; and based on the verification information indicating that the voice input was spoken by an unverified user, functionally disabling the NMD from performing the playback command.

Example 2: The method of Example 1, wherein the playback command includes instructions to change one or more state variables from a first value to a second value, and wherein functionally disabling the playback command comprises changing the one or more state variables from the first value to the second value, then immediately reverting the one or more state variables back to the first value such that the playback command is effectively ignored.

Example 3: The method of Example 1, wherein the playback command includes instructions to change one or more state variables from a first value to a second value, and wherein functionally disabling the playback command comprises ignoring the instructions by maintaining the state variables at the first value.

Example 4: The method of Example 1, wherein the playback command includes instructions to change one or more state variables from a first value to a second value, and wherein functionally disabling the playback command comprises not changing the one or more state variables as instructed by the one or more remote computing devices such that the playback command is effectively ignored.

Example 5: The method of Example 1, wherein the playback command is a command to play back particular media content via the NMD, and wherein functionally disabling the playback command comprises playing back the particular media content via the NMD at an inaudible volume.

Example 6: The method of Example 1, further comprising comparing the verification information to a biometric profile of a verified user.

Example 7: The method of Example 1, wherein the playback command is request for a change in volume or a request for initiation of playback of a particular media content.

Example 8: The method of Example 1, wherein the one or more remote computing devices are one or more first remote computing devices, and wherein obtaining the verification information comprises sending the voice input to one or more second remote computing devices for analysis and receiving the verification information from the one or more second remote computing devices, the one or more second remote computing devices not being associated with the VAS.

Example 9: The method of Example 1, wherein obtaining the verification information comprises deriving the verification information at the NMD.

Example 10: A network microphone device comprising one or more microphones configured to detect sound, one or more processors, and a tangible, non-tangible computer-readable medium having instructions stored thereon that are executable by the one or more processors to cause the network microphone device to perform the method of any of Examples 1 to 9.

Example 11: A tangible, non-transitory, computer-readable medium having instructions stored thereon that are executable by one or more processors to cause a network microphone device to perform the method of any one of Examples 1 to 9.

The invention claimed is:

1. A network microphone device (NMD) comprising:
one or more processors;
one or more microphones; and
a tangible, non-transitory, computer-readable medium storing instructions executable by the one or more processors to cause the NMD to perform operations comprising:
capturing a first voice input via the one or more microphones;
analyzing at least a portion of the first voice input to detect a first wake word;
based on the analyzed first voice input, detecting the first wake word;
after detecting the first wake word, transmitting first data associated with the first voice input to one or more remote computing devices associated with a voice assistant service (VAS);
in parallel with transmitting the first data, deriving, at the NMD, first verification information characterizing the first voice input;
after transmitting the first data, receiving a first response from the one or more remote computing devices, the first response comprising a first playback command;

after receiving the first response, and based on the first verification information indicating that the first voice input was spoken by a verified user, performing the first playback command via the NMD;

capturing a second voice input via the one or more microphones;

analyzing, via the NMD, at least a portion of the second voice input to detect a second wake word;

based on the analyzed second voice input, detecting the second wake word;

after detecting the second wake word, transmitting second data associated with the second voice input to one or more remote computing devices associated with a voice assistant service (VAS);

in parallel with transmitting the second data, deriving, at the NMD, second verification information characterizing the second voice input;

after transmitting the second data, receiving a second response from the one or more remote computing devices, the second response comprising a second playback command; and after receiving the second response, and based on the second verification information indicating that the second voice input was spoken by an unverified user, functionally disabling the NMD from performing the second playback command.

2. The NMD of claim 1, wherein the second playback command includes instructions to change one or more state variables from a first value to a second value, and wherein functionally disabling the NMD from performing the second playback command comprises changing the one or more state variables from the first value to the second value, then immediately reverting the one or more state variables back to the first value such that the second playback command is effectively ignored.

3. The NMD of claim 1, wherein the second playback command includes instructions to change one or more state variables from a first value to a second value, and wherein functionally disabling the NMD from performing the second playback command comprises ignoring the instructions by maintaining the state variables at the first value.

4. The NMD of claim 1, wherein the second playback command is a command to play back particular media content via the NMD, and wherein functionally disabling the NMD from performing the second playback command comprises playing back the particular media content via the NMD at an inaudible volume.

5. The NMD of claim 1, wherein the operations further comprise comparing the second verification information to a biometric profile of a verified user.

6. The NMD of claim 1, wherein the second playback command is a request for a change in volume or a request for initiation of playback of a particular media content.

7. The NMD of claim 1, wherein the operations further comprise, after functionally disabling the NMD from performing the second playback command, transmitting a status update to the one or more remote computing devices associated with the VAS indicating that the second playback command has not been performed.

8. A method comprising:

capturing a first voice input via one or more microphones of a network microphone device (NMD);

analyzing, via the NMD, at least a portion of the first voice input to detect a first wake word;

based on the analyzed first voice input, detecting the first wake word;

after detecting the first wake word, transmitting first data associated with the first voice input to one or more remote computing devices associated with a voice assistant service (VAS);

in parallel with transmitting the first data, deriving, at the NMD, first verification information characterizing the first voice input;

after transmitting the first data, receiving a first response from the one or more remote computing devices, the first response comprising a first playback command;

after receiving the first response, and based on the first verification information indicating that the first voice input was spoken by a verified user, performing the first playback command via the NMD;

capturing a second voice input via the one or more microphones of the NMD;

analyzing, via the NMD, at least a portion of the second voice input to detect a second wake word;

based on the analyzed second voice input, detecting the second wake word;

after detecting the second wake word, transmitting second data associated with the second voice input to one or more remote computing devices associated with a voice assistant service (VAS);

in parallel with transmitting the second data, deriving, at the NMD, second verification information characterizing the second voice input;

after transmitting the second data, receiving a second response from the one or more remote computing devices, the second response comprising a second playback command; and after receiving the second response, and based on the second verification information indicating that the second voice input was spoken by an unverified user, functionally disabling the NMD from performing the second playback command.

9. The method of claim 8, wherein the second playback command includes instructions to change one or more state variables from a first value to a second value, and wherein functionally disabling the NMD from performing the second playback command comprises changing the one or more state variables from the first value to the second value and reverting the one or more state variables back to the first value such that the second playback command is effectively ignored.

10. The method of claim 8, wherein the second playback command includes instructions to change one or more state variables from a first value to a second value, and wherein functionally disabling NMD from performing the second playback command comprises ignoring the instructions by maintaining the state variables at the first value.

11. The method of claim 8, wherein the second playback command is a command to play back particular media content via the NMD, and wherein functionally disabling the NMD from performing the second playback command comprises playing back the particular media content via the NMD at an inaudible volume.

12. The method of claim 8, further comprising comparing the second verification information to a biometric profile of a verified user.

13. The method of claim 8, wherein the second playback command is a request for a change in volume or a request for initiation of playback of a particular media content.

14. The method of claim 8, further comprising, after functionally disabling the NMD from performing the second playback command, transmitting a status update to the one or more remote computing devices associated with the VAS indicating that the second playback command has not been performed.

15. A tangible, non-transitory, computer-readable medium storing instructions executable by one or more processors to cause a network microphone device (NMD) to perform operations comprising:
- capturing a first voice input via one or more microphones of the NMD;
- analyzing, via the NMD, at least a portion of the first voice input to detect a first wake word;
- based on the analyzed first voice input, detecting the first wake word;
- after detecting the first wake word, transmitting first data associated with the first voice input to one or more remote computing devices associated with a voice assistant service (VAS);
- in parallel with transmitting the first data, deriving, at the NMD, first verification information characterizing the first voice input;
- after transmitting the first data, receiving a first response from the one or more remote computing devices, the first response comprising a first playback command;
- after receiving the first response, and based on the first verification information indicating that the first voice input was spoken by a verified user, performing the first playback command via the NMD;
- capturing a second voice input via the one or more microphones;
- analyzing, via the NMD, at least a portion of the second voice input to detect a second wake word;
- based on the analyzed second voice input, detecting the second wake word;
- after detecting the second wake word, transmitting second data associated with the second voice input to one or more remote computing devices associated with a voice assistant service (VAS);
- in parallel with transmitting the second data, deriving, at the NMD, second verification information characterizing the second voice input;
- after transmitting the second data, receiving a second response from the one or more remote computing devices, the second response comprising a second playback command; and
- after receiving the second response, and based on the second verification information indicating that the second voice input was spoken by an unverified user, functionally disabling the NMD from performing the second playback command.

16. The computer-readable medium of claim 15, wherein the second playback command includes instructions to change one or more state variables from a first value to a second value, and wherein functionally disabling the second playback command comprises changing the one or more state variables from the first value to the second value, then immediately reverting the one or more state variables back to the first value such that the second playback command is effectively ignored.

17. The computer-readable medium of claim 15, wherein the second playback command includes instructions to change one or more state variables from a first value to a second value, and wherein functionally disabling the second playback command comprises ignoring the instructions by maintaining the state variables at the first value.

18. The computer-readable medium of claim 15, wherein the second playback command is a command to play back particular media content via the NMD, and wherein functionally disabling the second playback command comprises playing back the particular media content via the NMD at an inaudible volume.

19. The computer-readable medium of claim 15, wherein the operations further comprise comparing the second verification information to a biometric profile of a verified user.

20. The computer-readable medium of claim 15, wherein the second playback command is a request for a change in volume or a request for initiation of playback of a particular media content.

* * * * *

UNITED STATES PATENT AND TRADEMARK OFFICE
CERTIFICATE OF CORRECTION

| | | |
|---|---|---|
| PATENT NO. | : 11,887,598 B2 | Page 1 of 1 |
| APPLICATION NO. | : 18/061243 | |
| DATED | : January 30, 2024 | |
| INVENTOR(S) | : Connor Kristopher Smith | |

It is certified that error appears in the above-identified patent and that said Letters Patent is hereby corrected as shown below:

In the Specification

In Column 2, after Line 10, insert the following paragraph:
-- Figure 9 is a message flow diagram of a media playback system in accordance with aspects of the disclosure. --, therefor.

Signed and Sealed this
Tenth Day of February, 2026

John A. Squires
*Director of the United States Patent and Trademark Office*